United States Patent
He et al.

(10) Patent No.: US 8,364,034 B2
(45) Date of Patent: Jan. 29, 2013

(54) IN-BAND OPTICAL NOISE MEASUREMENT USING DIFFERENTIAL POLARIZATION RESPONSE

(75) Inventors: Gang He, Québec (CA); Normand Cyr, Québec (CA); Daniel Gariepy, Québec (CA)

(73) Assignee: EXFO Inc., Quebec (Quebec) (CA)

( * ) Notice: Subject to any disclaimer, the term of this patent is extended or adjusted under 35 U.S.C. 154(b) by 34 days.

(21) Appl. No.: 12/859,648

(22) Filed: Aug. 19, 2010

(65) Prior Publication Data

US 2011/0091206 A1 Apr. 21, 2011

Related U.S. Application Data

(63) Continuation-in-part of application No. 12/594,503, filed as application No. PCT/CA2008/000647 on Apr. 4, 2008.

(60) Provisional application No. 60/910,352, filed on Apr. 5, 2007, provisional application No. 61/235,169, filed on Aug. 19, 2009.

(51) Int. Cl.
*H04B 10/08* (2006.01)

(52) U.S. Cl. .................. 398/25; 398/9; 398/26; 398/34; 398/38

(58) Field of Classification Search ............ 398/9, 25, 398/26, 34, 38
See application file for complete search history.

(56) References Cited

U.S. PATENT DOCUMENTS

| | | | |
|---|---|---|---|
| 6,347,169 B1 | 2/2002 | Kang et al. | |
| 6,362,874 B1 | 3/2002 | Madsen | |
| 6,480,637 B1 | 11/2002 | Yao | |
| 6,504,604 B1 | 1/2003 | Holland | |
| 6,591,024 B2 | 7/2003 | Westbrook | |
| 6,636,306 B2 | 10/2003 | He et al. | |
| 6,813,021 B2 | 11/2004 | Chung et al. | |
| 7,068,412 B2 | 6/2006 | Fujiwara et al. | |
| 7,106,443 B2 | 9/2006 | Wein et al. | |
| 7,149,407 B1 | 12/2006 | Doerr et al. | |
| 7,149,428 B2 | 12/2006 | Chung et al. | |
| 7,756,369 B2 | 7/2010 | Rudolph et al. | |
| 2001/0052981 A1 | 12/2001 | Chung et al. | |
| 2002/0053677 A1 | 5/2002 | Sarathy et al. | |

(Continued)

FOREIGN PATENT DOCUMENTS

WO 2008122123 10/2008
WO 2009062237 5/2009

OTHER PUBLICATIONS

JDSU Corporation: "Measuring the Optical Signal-to-Noise Ratio in Agile Optical Networks", Technical Note, 2005, pp. 1-10.*

(Continued)

*Primary Examiner* — Li Liu
(74) *Attorney, Agent, or Firm* — Alexandre Daoust

(57) ABSTRACT

A method comprises: acquiring, for a number nSOP of varied State-Of-Polarization analysis conditions of the input optical signal, nSOP polarization-analyzed optical spectrum traces; mathematically discriminating said signal contribution from said noise contribution within said optical signal bandwidth using said polarization-analyzed optical spectrum traces, said mathematically discriminating comprising: obtaining a differential polarization response that is related to the optical spectrum of said signal contribution by a constant of proportionality; estimating the constant of proportionality of a differential polarization response to the optical spectrum of said signal contribution; estimating the optical spectrum of said noise contribution from said input optical signal, within said optical signal bandwidth using said constant of proportionality and said differential polarization response; and determining said in-band noise parameter on said input optical signal from the mathematically discriminated noise contribution.

33 Claims, 12 Drawing Sheets

U.S. PATENT DOCUMENTS

| | | | |
|---|---|---|---|
| 2002/0190261 A1 | 12/2002 | Sarathy et al. | |
| 2003/0020899 A1 | 1/2003 | Stolte et al. | |
| 2003/0090755 A1 | 5/2003 | Chung et al. | |
| 2003/0174312 A1 | 9/2003 | Leblanc | |
| 2003/0219250 A1 | 11/2003 | Wein et al. | |
| 2004/0114923 A1* | 6/2004 | Chung et al. | 398/26 |
| 2004/0136636 A1 | 7/2004 | Rogers | |
| 2004/0156632 A1 | 8/2004 | Lee et al. | |
| 2004/0174517 A1 | 9/2004 | Brendel | |
| 2005/0031341 A1 | 2/2005 | Stuart | |
| 2005/0094130 A1 | 5/2005 | Han et al. | |
| 2006/0051087 A1 | 3/2006 | Martin et al. | |
| 2006/0098980 A1 | 5/2006 | Lee et al. | |
| 2007/0297043 A1 | 12/2007 | Kao et al. | |
| 2008/0124076 A1 | 5/2008 | Rudolph et al. | |
| 2008/0205886 A1 | 8/2008 | Anderson et al. | |
| 2010/0129074 A1* | 5/2010 | Gariepy et al. | 398/26 |

OTHER PUBLICATIONS

J. H. Lee et al., "OSNR Monitoring Technique Using Polarization-Nulling Method", IEEE Photonics Technology Letters, vol. 13, No. 1, Jan. 2001.

Audet, Francis, "Commissioning RoadMs", Application Note 169, EXFO Electro-Optical Engineering, Inc., available at http://documents.exfo.com/appnotes/anote169-2ang.pdf on Sep. 14, 2007, 6 pages.

Gariepy Daniel and Gang He, "Measuring OSNR in WDM Systems—Effects of Resolution Bandwidth and Optical Rejection Ratio", Application Note 098, Exfo Electro-Optical Engineering Inc. available at http://documents.exfo.com/appnotes/anote098-ang.pdf on Jul. 3, 2003, 16 pages.

JDS Uniphase Corporation, "Measuring the Optical Signal-to-Noise Ration in Agile Optical Networks", Technical Note, available at http://www.jdsu.com/product-literature/AON_tn_fop_tm_ae.pdf, 2005, pp. 1-10.

Jung, D.K. et al., "OSNR monitoring technique using polarization-mulling method", Optical Fiber Communication Conference, 2000, vol. 2, pp. 176-178, WK4-1-WK4-3.

Lee, J.H. et al., "An Improved OSNR Monitoring Technique based on Polarization-Nulling Method", Optical Fiber Communication Conference and Exhibit, 2001, vol. 2, pp. tuP6-1-tuP6-3.

International Standard, IEC 61280-2-9, Edition 1.0, Fibre optic communication subsystem test procedures—Part 2-9: Digital systems—Optical signal-to-noise ratio measurement for dense wavelength-division multiplexed systems, International Electrotechnical Commission, Oct. 29, 2002.

He G. et al., 2009, "Measuring the In-Band Signal-to-Noise Ratio Within Narrow Optical Channels.", Technical Note 038, EXFO Electro-Optical Engineering Inc., 8 pages.

Moench W. et al., 2007, "Measuring the Optical Signal-to-Noise ratio in Agile Optical Networks.", Optical Fiber Communication and the National Fiber Optic Engineers Conference, OFC/NFOEC, Anaheim, CA, 6 pages.

Tian X. et al., 2006, "Precise In-Band OSNR and Spectrum Monitoring Using High-Resolution Swept Coherent Detection.", IEEE Photonics Technology Letters, vol. 18, No. 1, pp. 145-147.

Skold M. et al., 2005, "PMD-Insensitive DOP-based OSNR Monitoring by Spectral SOP Measurements.", Technical Digest of Optical Fiber Communication Conference OFC/NFOEC 2005, 3 pages.

Petersson M. et al., 2002, "Multi-Channel OSNR Monitoring for WDM Networks.", 28th European Conference on Optival Communication ECOC 2002, Copenhagen, 2 pages.

Bakaul M., 2008, "Low-Cost PMD-Insensitive and Dispersion Tolerant In-Band OSNR Monitor Based on Uncorrelated Beat Noise Measurement.", IEEE Photonics Technology Letters, vol. 20, No. 11, pp. 906-908.

* cited by examiner

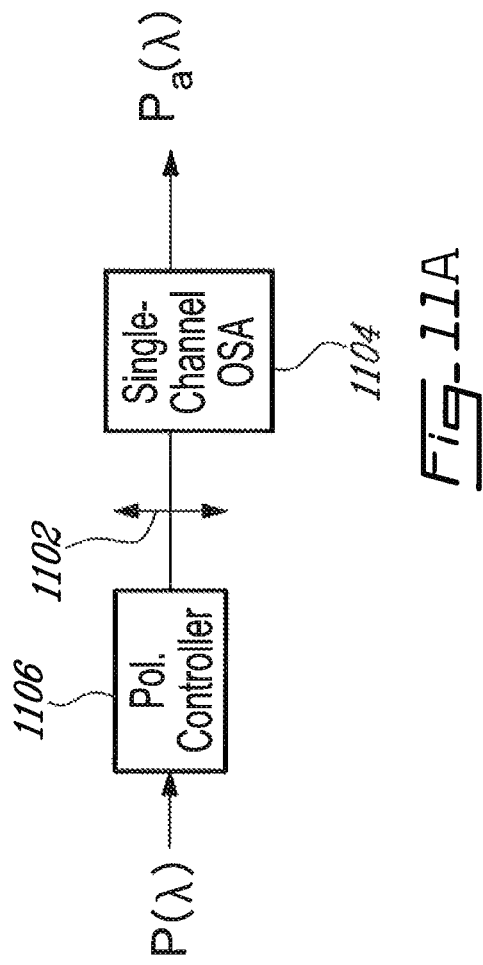
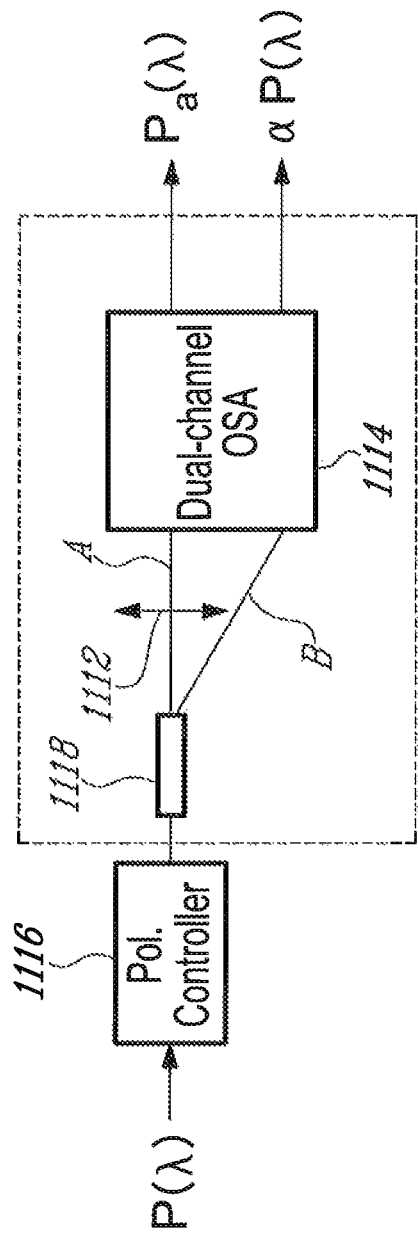
Fig. 11A
Fig. 11B

IN-BAND OPTICAL NOISE MEASUREMENT USING DIFFERENTIAL POLARIZATION RESPONSE

CROSS-REFERENCE TO RELATED APPLICATIONS

This application is a continuation-in-part of U.S. patent application Ser. No. 12/594,503 which international filing date is Apr. 4, 2008, now pending, and which claims priority under 35USC§119(e) of U.S. provisional patent application 60/910,352 filed Apr. 5, 2007; the specifications of which are hereby incorporated by reference. This application also claims priority under 35USC§119(e) of U.S. provisional patent application 61/235,169 filed Aug. 19, 2009, the specification of which being hereby incorporated by reference.

TECHNICAL FIELD

The invention relates to the determination of the in-band noise in optical telecommunication applications. More specifically, the invention relates to the determination of the in-band noise in Dense Wavelength Division Multiplexing (DWDM) optical networks.

BACKGROUND OF THE ART

The Optical Signal-to-Noise Ratio (OSNR) is a direct measure of the quality of signal carried by an optical telecommunication link. Under normal and proper operating conditions, the OSNR of an optical communication link is typically high, often in excess of 15 dB or 20 dB, or even greater. The dominant component of the noise in an optical communication link is typically unpolarized Amplified Spontaneous Emission (ASE), which is a broadband noise source contributed by the optical amplifiers in the link. In general, the ASE may be considered to be spectrally flat across the small wavelength range spanning the full signal spectral width, provided that there is no spectral filtering in the vicinity of the signal.

The IEC 61280-2-9 Fiber-optic communication subsystem test procedures—Part 2-9 standards (ed. 1.0 b:2002) provides a standard method for determining OSNR in Dense Wavelength Division Multiplexing (DWDM) networks. This method is based on the assumption that the interchannel noise level is representative of the noise level at the signal peak position. The method interpolates the power level of the noise outside the signal bandwidth to evaluate the in-band noise in the signal bandwidth. Increased modulation rates, which enlarge the signal bandwidth, and increased channel density, reduce the interchannel width; therefore resulting in severe spectral characteristics requirements for the optical spectrum analyzers used to perform the measurement. The procedures described in the standards are able to cope with these difficulties when the noise level of adjacent peaks is mostly continuous. For example, the standards propose a two-scan procedure to first measure a broad modulated peak with a larger resolution bandwidth to capture the entire signal peak and then determine the noise using a narrow resolution bandwidth to minimize the contributions of the main and adjacent peaks on the interchannel noise level. Alternatively, commercial Optical Spectrum Analyzers (OSA) (such as EXFO's FTB-5240, in its versions available before 2007) implement a related procedure by performing an integrated peak calculation and fine noise determination in a single scan.

However, to strictly comply with the standards recommendation, the noise level should be determined at the mid-channel spacing between peaks. In the case where noise is spectrally filtered with the signal peak, for instance, after passing through multiplexers or demultiplexers—such as Reconfigurable Optical Add Drop Multiplexers (ROADM)—the mid-spacing noise level is no longer representative of the in-band noise level, which is the relevant parameter for the OSNR determination. The interpolation of the interchannel noise level then becomes unreliable. This can be mitigated by relying on a very sharp spectral response of the OSA filter and adaptive processing to determine the noise level at the shoulders where the noise meets the base of a signal profile within the channel bandwidth. However, increased modulation rates combined with narrow filtering of multiplexers and demultiplexers is making it increasingly difficult to achieve a reliable measurement of the noise level within the channel bandwidth.

Active polarization-nulling (see J. H. Lee et al, "OSNR Monitoring Technique Using Polarization-Nulling Method", IEEE Photonics Technology Letters, Vol. 13, No. 1, January 2001) provides an alternative to a direct analysis of the optical spectrum. This method uses the fact that the signal peak is generally polarized while the noise is generally unpolarized. Using a polarization controller cascaded with a polarizer (the latter serving as an analyzer), it is possible to actively control the polarization of the input signal in order to find a condition where the signal peak is maximally suppressed by the polarizer. An optical spectrum trace is acquired while the signal peak is suppressed and reveals the in-band noise within the optical channel bandwidth. The noise level within the optical channel bandwidth can be determined using the acquired optical spectrum trace.

Variants to the active polarization-nulling method are described in U.S. Pat. No. 7,106,443 to Wein et al.; in Sköld et al., "PMD-insensitive DOP-based OSNR monitoring by spectral SOP measurements", Paper OThH3, Optical Fiber Communications Conference, Anaheim, USA, March 2005); and in U.S. Pat. No. 7,756,369 to Rudolph et al.

The active polarization-nulling method and its variants all require that the polarized signal peak be suppressed at or very close to zero. In practice, this requires a degree of extinction of the signal peak which is at least 10 dB greater than the highest possible OSNR to be measured. For example, for measuring an OSNR of 25 dB within an accuracy of 0.5 dB, a 38-dB extinction is required. This high degree of extinction imposes constraints on the instrumental noise floor that normally is often limited by the electronics, quality of the polarization-diversity optics, etc., which, in order to be satisfactorily overcome, requires increasing the inherent cost of the instrument. Notwithstanding the aforementioned instrumental constraints, attainment of such a high extinction ratio also requires either an excellent coverage of the States-Of-Polarization (SOPs) on the Poincaré sphere, i.e. the generation of a very large number of SOPs or the use of a full "high-end", i.e. very accurately calibrated, and hence costly polarimetric OSA.

It is noted however that the limiting noise source in most optically-filtered long-haul optical networks is the signal-ASE beat noise, in which the signal and the ASE interfere at baseband frequencies within the electronic detection bandwidth. In typical optical communications systems employing optical amplifiers, signal-ASE beat noise is the limiting noise term for optical performance, and can be directly related to the Bit Error Rate (BER) of the optical communication channel. Thus, estimation of the in-band OSNR provides an indicative measure of the system performance. However, new systems are currently being developed and deployed which exploit multi-bit-per-symbol advanced modulation formats to transmit more than 100 Gbit/s, with symbol rates of 27 GBaud and higher. Not only are the associated optical spectra of the modulated signals much wider than previous (generally on-off-keying) 10 Gb/s systems, but the spectral profiles are often more complicated, and not necessarily "sharply peaked" at the center. Hence, accurate signal-ASE beat noise estimations may require a convolution of the superposed (or "underlying", a less rigorous but widely employed terminology) optical noise spectral trace with the signal spectral trace. In tightly filtered systems, this underlying noise is itself often filtered over a significant portion of the channel bandwidth, near the filter edges. Accordingly, OSNR of such systems can not be determined reliably based on an estimation of the underlying in-band noise assuming a flat optical noise spectral trace.

There is thus a need for reliably determining the optical noise spectral trace underlying the optical signal peak. In particular, there is a need of methodology that is applicable in the case of DWDM networks, where individual channels may carry respective signals that have traversed different optical links and hence have different underlying noise properties.

SUMMARY

One alternative approach to both the interpolation method and the active polarization-nulling method, is more fully described in the specification of U.S. patent application Ser. No. 12/594,503 which is incorporated herein, the latter application commonly owned by the Applicant. One aspect described referred to as the Passive Polarization-Induced Discrimination (PPID) approach. The PPID approach involves the polarization-diverse detection of an optical spectrum with optical spectrum analyzer means, where two optical spectrum traces are acquired under different, and typically orthogonal, polarization analysis conditions. However, unlike the active polarization-nulling method where the ultimate OSNR that can be measured approximately corresponds to the maximum measured difference between spectrum traces taken under the orthogonal polarization analysis conditions, the ultimate OSNR that can be measured with the PPID approach can be significantly greater than this maximum measured difference. In other words, the PPID approach does not require at all that the polarized signal be suppressed or close to the electronic noise floor of the measurement instrument. This results in significantly less stringent requirements on the polarization control of the signal-under-test, the quality (e.g. polarization extinction ratio) of the OSA components, and the measurement time can be significantly reduced compared to the active polarization-nulling method.

It is noted that in one embodiment of the PPID approach as described in Gariépy et al. an estimation of the in-band noise level of the optical signal based is made on the evaluation of the noise level at the edges of the signal peaks. Using an iterative calculation, the noise level trace may be estimated in-band at wavelengths closer to the signal peak, but the error on the estimated noise level increases as the signal component increases near the signal peak.

It will be noted that in the instant specification, reference is made to the Differential POLarization (D-Pol) response approach. It should be understood that this approach can correspond to the Passive Polarization-Induced Discrimination (PPID) approach as described in WO 2008/122123 A1 to Gariépy et al. and that the two nomenclatures refer to the same technique.

There is provided a system and method for determining a noise parameter, such as the in-band noise or the Optical Signal-to-Noise Ratio (OSNR), of a Dense Wavelength Division Multiplexing (DWDM) input optical signal having a signal and a noise contribution $N(\lambda)$ within an optical signal bandwidth. The method uses a Differential POLarization response (D-Pol) approach to estimate the noise underlying the optical signal.

The provided system and method are particularly valuable for determining the spectral trace of the in-band noise, and thus the OSNR, in agile multichannel Dense Wavelength Division Multiplexing (DWDM) optical systems. In such agile systems, optical channels may be added or dropped anywhere along an optical network, after or before being optically amplified. Adding and dropping is typically performed using Optical Add Drop Multiplexers (OADM) which not only filter the signal corresponding to the optical channel but also filter the noise. The optical noise is filtered with the useful signal peak and is consequently spectrally limited to the channel bandwidth or spectral neighborhood of the optical channel and also varies from one DWDM channel to another. The interchannel noise is therefore not generally representative of the in-band noise of the optical channel.

The provided system and method are also particularly valuable for systems which are currently being developed and deployed and exploit multi-bit-per-symbol advanced modulation formats to transmit more than 100 Gbit/s, with symbol rates of 27 GBaud and higher. In these system, not only are the associated optical spectra of the modulated signals much wider than previous on-off-keying 10 Gb/s systems, but the spectral profiles are often more complicated, and not necessarily sharply peaked at the center. Hence, accurate signal-ASE beat noise estimations may require a convolution of the underlying optical noise spectral trace with the signal spectral trace. In tightly filtered systems, this underlying noise is itself often filtered over a significant portion of the channel bandwidth, near the filter edges. Accordingly, OSNR of such systems can not be determined reliably based on an estimation of the underlying in-band noise assuming a flat optical noise spectral trace. Moreover, perturbations to the noise spectral trace, notably due to crosstalk from closely-spaced neighboring channels, may render even more unreliable OSNR determinations predicated such an estimation.

The provided system and method are based on the analysis of multiple measurements, corresponding to different states of polarization (SOP) of the optical input signal impinging upon an (polarizing) analyzer, the multiple measurements comprising optical spectrum traces of polarization-analyzed input optical signal (which can be referred to as polarization-analyzed optical spectrum traces). The system and method employs an ab initio statistical approach for deriving an approximate value of a parameter κ which is indicative of a proportion of the signal contribution $S(\lambda)$ in the polarization-analyzed measurements. If characteristics of the distribution of SOP analysis conditions is known, the approximate value of κ can be determined as a function of the number of measurements made ($n_{SOP}$) under various SOPs. No assumption needs to be made about the underlying shape of the noise contribution $N(\lambda)$ within the signal bandwidth. Once the value of κ has been determined, one can directly construct the complete spectral trace of the noise contribution $N(\lambda)$ underlying the signal peak.

In accordance with one aspect, there is provided a method for determining an in-band noise parameter on an input optical signal ($P(\lambda)$) having a data-carrying signal contribution ($S(\lambda)$) and a noise contribution ($N(\lambda)$) within an optical signal bandwidth, said signal contribution being at least partly polarized and said noise contribution being mostly unpolarized, the method comprising: acquiring, for a number $n_{SOP}$ of varied State-Of-Polarization (SOP) analysis conditions of the input optical signal ($P(\lambda)$), $n_{SOP}$ polarization-analyzed optical spectrum traces ($Pa(\lambda)$); mathematically discriminating said signal contribution from said noise contribution within said optical signal bandwidth using said polarization-analyzed optical spectrum traces (Pa($\lambda$)), said mathematically discriminating comprising: obtaining a differential polarization response (S'($\lambda$)) that is related to the optical spectrum of said signal contribution (S($\lambda$)) by a constant of proportionality; estimating the constant of proportionality of a differential polarization response (S'($\lambda$)) to the optical spectrum of said signal contribution (S($\lambda$)) by a constant-of-proportionality evaluation step comprising one of i) an ab initio calculation as a function of said number $n_{SOP}$, and ii) using values of said polarization-analyzed optical spectrum traces (Pa($\lambda$)) at least close to a peak wavelength where the noise contribution is minimal relative to the signal contribution; estimating the optical spectrum of said noise contribution N($\lambda$) from said input optical signal (P($\lambda$)), within said optical signal bandwidth using said constant of proportionality and said differential polarization response (S'($\lambda$)); and determining said in-band noise parameter on said input optical signal from the mathematically discriminated noise contribution.

The noise parameter can comprise an optical signal-to-noise ratio of the input optical signal.

The noise parameter can comprise an electrical noise level corresponding to the input optical signal and wherein said determining said in-band noise parameter comprises: calculating said electrical noise level from the optical spectrum of said signal contribution and the optical spectrum of said noise contribution.

The method can further comprise outputting the determined noise parameter.

A method for determining an in-band noise parameter on an input optical signal p having a data-carrying signal contribution and a noise contribution within an optical signal bandwidth, said signal contribution being at least partly polarized and said noise contribution being mostly unpolarized, the method comprising: acquiring at least one pair of optical spectrum traces comprising mutually-orthogonal optical spectrum traces ($P_>$($\lambda$) and $P_<$($\lambda$)) of the input optical signal corresponding to mutually-orthogonal State-Of-Polarization (SOP) analysis conditions, said SOP analysis conditions being arbitrary relative to said input optical signal; mathematically discriminating said signal contribution from said noise contribution within said optical signal bandwidth using said mutually-orthogonal optical spectrum traces ($P_>$($\lambda$), $P_<$($\lambda$)); and determining said in-band noise parameter on said input optical signal from the discriminated noise contribution.

In accordance with one aspect, there is provided a method for determining an in-band noise parameter on an input optical signal having a data-carrying signal contribution and a noise contribution within an optical signal bandwidth, the method comprising: acquiring a number $n_{SOP}$ of pairs of mutually-orthogonal optical spectra corresponding to the number $n_{SOP}$ of varied State-Of-Polarization (SOP) analysis conditions which are arbitrary relative to the input optical signal; mathematically discriminating the signal contribution from the noise contribution within the optical signal bandwidth using the mutually-orthogonal optical spectra by: defining a differential polarization response that is related by a constant of proportionality to the optical spectrum of the signal contribution within the optical signal bandwidth; estimating the constant of proportionality of the differential polarization response to the optical spectrum of said signal contribution as a function of said number $n_{SOP}$ of said SOP analysis conditions; and estimating the optical spectrum of the noise contribution within the optical signal bandwidth using the constant of proportionality; and determining the in-band noise parameter on the input optical signal from the discriminated noise contribution.

In accordance with one aspect, there is provided a method for determining an in-band noise parameter on an input optical signal having a data-carrying signal contribution and a noise contribution within an optical signal bandwidth, said signal contribution being at least partly polarized and said noise contribution being mostly unpolarized, the method comprising: (1) acquiring a number $n_{SOP}$ of pairs of mutually-orthogonal optical spectra ($P_>$($\lambda$), $P_<$($\lambda$)) corresponding to said number $n_{SOP}$ of varied State-Of-Polarization (SOP) analysis conditions which are arbitrary relative to said input optical signal, each one of said pairs of mutually-orthogonal optical spectra corresponding to mutually-orthogonal SOP analysis conditions; (2) mathematically discriminating said signal contribution from said noise contribution within said optical signal bandwidth using said mutually-orthogonal optical spectra ($P_>$($\lambda$), $P_<$($\lambda$)), said mathematically discriminating comprising: defining a differential polarization response (S'($\lambda$)) that is related by a constant of proportionality to the optical spectrum of said signal contribution (S($\lambda$)) within said optical signal bandwidth; estimating said constant of proportionality of said differential polarization response (S'($\lambda$)) to the optical spectrum of said signal contribution (S($\lambda$)) as a function of said number $n_{SOP}$ of said SOP analysis conditions; and estimating the optical spectrum of said noise contribution N($\lambda$) within said optical signal bandwidth using said constant of proportionality and said differential polarization response (S'($\lambda$)); and (3) determining said in-band noise parameter on said input optical signal from the discriminated noise contribution.

In accordance with another aspect, there is provided a method for determining an in-band noise parameter on an input optical signal having a data-carrying signal contribution and a noise contribution within an optical signal bandwidth, said signal contribution being at least partly polarized and said noise contribution being mostly unpolarized, the method comprising: (1) acquiring at least one pair of optical spectrum traces comprising mutually-orthogonal optical spectra ($P_>$($\lambda$) and $P_<$($\lambda$)) of the input optical signal corresponding to mutually-orthogonal State-Of-Polarization (SOP) analysis conditions, said SOP analysis conditions being arbitrary relative to said input optical signal; (2) mathematically discriminating said signal contribution from said noise contribution within said optical signal bandwidth using said mutually-orthogonal optical spectra ($P_>$($\lambda$), $P_<$($\lambda$)), said mathematically discriminating comprising: defining a differential polarization response (S'($\lambda$)) that is related by a constant of proportionality to the optical spectrum of said signal contribution (S($\lambda$)) within said optical signal bandwidth; estimating said constant of proportionality of said differential polarization response (S'($\lambda$)) to the optical spectrum of said signal contribution (S($\lambda$)) as a function of the number $n_{SOP}$ of accumulated ones of said pair of optical spectrum traces; and estimating the optical spectrum of said noise contribution within said optical signal bandwidth using said constant of proportionality and said differential polarization response (S'($\lambda$)); (3) determining said in-band noise parameter on said input optical signal from the discriminated noise contribution; and (4) performing the steps of said acquiring and said mathematically discriminating a plurality of times to accumulate said accumulated ones of said pair of optical spectrum traces using varied SOP analysis conditions and to refine the estimated optical spectrum of said noise contribution using said accumulated ones of said pair of optical spectrum traces.

In accordance with one aspect, there is provided a method for determining a noise parameter characterizing an input optical signal having a data-carrying signal contribution and a noise contribution within an optical signal bandwidth, the signal contribution and the noise contribution having at least one of different degrees of polarization and different states of polarization from one another, the method comprising: i. Acquiring spectral data at acquisition wavelengths within said optical signal bandwidth corresponding to first ($P_>(\lambda)$) and second ($P_<(\lambda)$) optical spectrum traces of the input optical signal using respectively first and second polarization analysis conditions, said first trace corresponding to a greater optical power than said second trace over most of the said optical signal bandwidth, said first and second polarization analysis conditions being substantially mutually orthogonal, the first said polarization analysis condition being arbitrary relative to the state of polarization (SOP) of said input optical signal, the sum of the said first and second optimum spectrum traces ($P_{sum}(\lambda)$) being equal to the spectrum of the total said input optical signal; ii. Calculating therefrom a normalized ratio of said first optical spectrum trace ($P_>(\lambda)$) for a multiplicity of said acquisition wavelengths; iii. Performing steps (i) and (ii) at least nSOP times, comprising nSOP different SOPs of said input optical signal, and for each said acquisition wavelength of each said performance of said steps, conserving an extrema (max;min) value among all of the preceding said normalized ratios, the set of extrema values so obtained thereby representing extrema normalized ratios for each acquisition wavelength among the at least nSOP said first optical spectrum traces; iv. Mathematically discriminating said data-carrying signal contribution from said noise contribution within said optical signal bandwidth using said set of extrema values; and v. Determining an in-band noise level estimate on said input optical signal from the discriminated noise contribution.

In accordance with one aspect, there is provided a method for determining a noise parameter characterizing an input optical signal having a data-carrying signal contribution and a noise contribution within an optical signal bandwidth, said signal contribution and said noise contribution having at least one of different degrees of polarization and different states of polarization from one another, the method comprising: i. Acquiring first and second optical spectrum traces of the input optical signal using respectively first and second polarization analysis conditions, said first and second polarization analysis conditions being mutually orthogonal and each being arbitrary relative to said input optical signal, said optical spectrum traces showing different signal-to-noise ratios; ii. Mathematically discriminating said signal contribution from said noise contribution within said optical signal bandwidth using said optical spectrum traces; and iii. Determining an in-band noise level on said input optical signal from the discriminated noise contribution.

In this specification, the expression trace is not to be construed limitatively to data that is displayed graphically, but is intended to encompass data which is not displayed graphically but nonetheless used for any suitable purpose.

BRIEF DESCRIPTION OF THE DRAWINGS

FIGS. 11A, 11B, and 11C show three alternative means for acquiring optical spectrum data that do not require a polarization-diverse OSA means.

It will be noted that throughout the appended drawings, like features are identified by like reference numerals.

DETAILED DESCRIPTION

Figure 1:
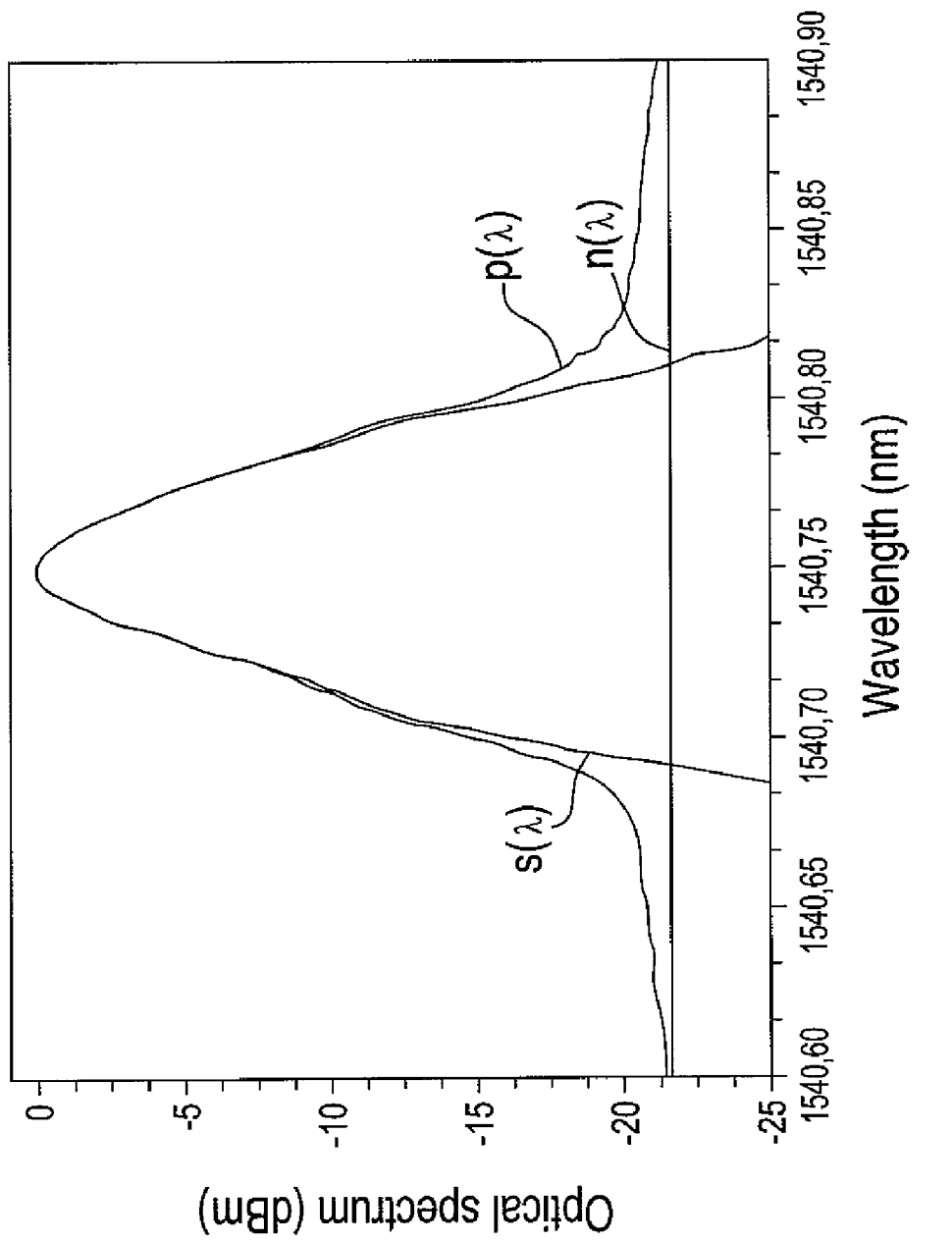
FIG. 1 is a graph illustrating the optical spectrum of an example input optical signal along with the optical spectrum of its noise contribution and of its signal contribution.

Now referring to FIG. 1, the methods and systems described herein relate to the characterization of an optical signal p which is used in optical telecommunications to transmit data over a Dense Wavelength Division Multiplexing (DWDM) optical channel. Throughout the present description, the optical signal p corresponds to one of the DWDM optical channels. In the optical channel bandwidth of interest, the optical signal p includes two components, i.e. a signal contribution s arising from the data-carrying signal, and a noise contribution n which includes all other sources of optical power within the optical channel. The noise contribution n arises mostly from the Amplified Spontaneous Emission (ASE) noise of the optical amplifiers in the optical transmission system. FIG. 1 shows the optical spectrum $p(\lambda)$ of an example optical signal p, along with the optical spectrum of its signal contribution $s(\lambda)$ and the optical spectrum of its noise contribution $n(\lambda)$, such that:

$$p(\lambda)=s(\lambda)+n(\lambda), \quad (1)$$

and $p=\int_{CBW} p(\lambda),$
$s=\int_{CBW} s(\lambda),$
$n=\int_{CBW} n(\lambda),$ and where CBW is the Channel B and Width of interest.

An optical spectrum trace of the optical signal p can be acquired by an Optical Spectrum Analyzer (OSA) and represents the input optical signal p convolved with the filter spectral response of the OSA $h_{OSA}(\lambda)$ combined with any desired convolution window $h_W(\lambda)$. The optical spectrum trace $P(\lambda)$ is thus the spectrally-resolved optical power of the optical signal p. In a bandwidth corresponding to the channel bandwidth CBW, the optical spectrum trace $P(\lambda)$ also includes a signal contribution $S(\lambda)$ and a noise contribution $N(\lambda)$ which are merged together and appear as the optical spectrum trace $P(\lambda)$.

The methods and systems described herein are used to discriminate the signal contribution $S(\lambda)$ from the noise contribution $N(\lambda)$ in the optical spectrum trace $P(\lambda)$ in order to determine the in-band noise on the input optical signal to be characterized. The instrument noise associated with the detection system itself, namely the OSA, on the acquired optical spectrum trace $P(\lambda)$ is considered to have a negligible effect compared to the optical noise contribution to be characterized.

FIG. 1 shows a single optical signal p within its corresponding optical channel but it should be noted that according to wavelength division multiplexing a plurality of optical channels shares the optical spectrum, each channel for transmitting one optical signal (not shown). It should however be kept in mind that other optical signals are typically present in the optical spectrum, spectrally on both sides of the optical signal p.

A DWDM optical channel is being defined as a spectral bandwidth, i.e. the channel bandwidth, allocated for the transmission of an optical signal in a WDM transmission scheme. The signal bandwidth is rather the actual width of the signal peak, i.e. the bandwidth over which the signal contribution is non negligible. The channel bandwidth may be larger than or just as large as (or even narrower than) the signal bandwidth, depending on the density of the DWDM channels and the signal transmission rate for a given transmission scheme.

The methods disclosed herein rely on the fact that the polarization properties of the signal and noise contributions within the optical channel are different. The signal contribution s is substantially polarized while the noise contribution n is mostly unpolarized. This qualitative difference is exploited to discriminate the signal contribution $S(\lambda)$ from the noise contribution $N(\lambda)$ in acquired optical spectrum traces $P(\lambda)$.

A first approach for determining the in-band noise or the OSNR of an input optical signal p in a DWDM optical system using a Differential POLarization response (D-Pol) approach is described in WO 2008/122123 A1 to Gariépy et al. commonly owned by applicant. This approach will be first recapitulated. It is noted that for consistency with the subsequent description, the nomenclature and parameterization employed in the present specification varies slightly from that of Gariépy et al., but that two are conceptually the same. Notably, the PPID approach of Gariépy et al., is herein referred to as D-Pol.

A second approach which is also a D-Pol approach but that is considered herein as an improvement of the first approach is then described and is referred to as the Improved D-Pol (I-D-Pol) approach.

Let $p(\lambda)$ be the optical spectrum of the input optical signal p, comprising a signal contribution $s(\lambda)$ and a noise contribution $n(\lambda)$. Both the D-Pol and I-D-Pol approaches exploit the differential properties between the signal contribution $s(\lambda)$ and the noise contribution $n(\lambda)$ in the input optical signal to be analyzed. The signal contribution $s(\lambda)$ and noise contribution $n(\lambda)$ have different polarization properties in that the signal is typically polarized, or at least partly polarized, while the noise is typically unpolarized, or mostly unpolarized. In other words, the signal and the noise contributions have different degrees of polarization from one another. This last condition will be assumed for the following description.

Figure 2:
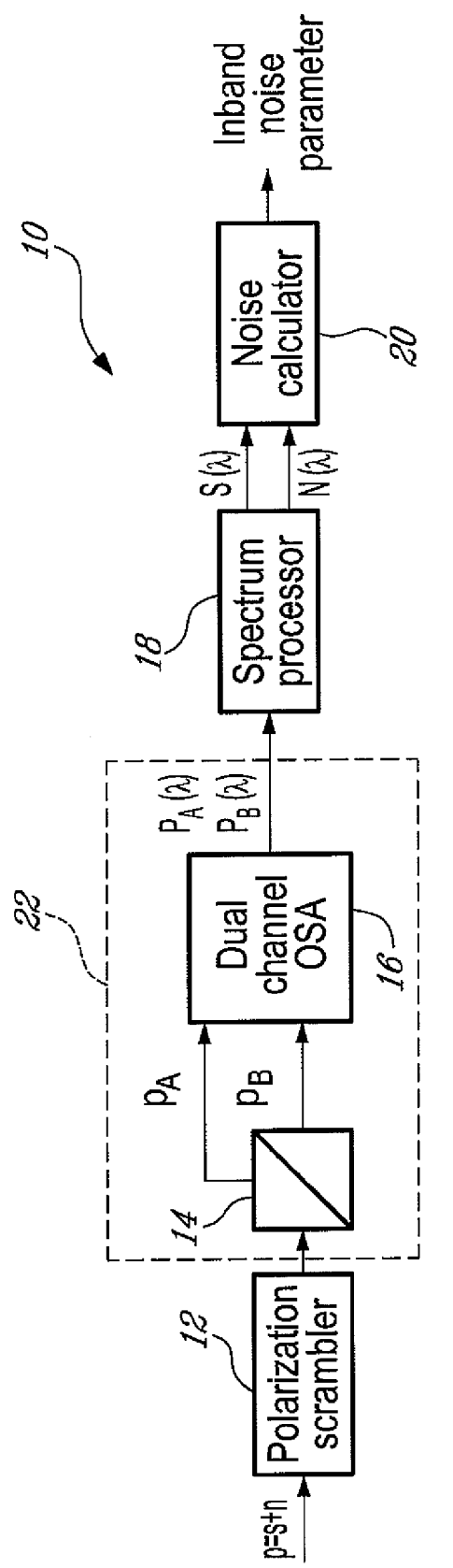
FIG. 2 is a block diagram showing the main components of a system for determining a noise parameter on an input optical signal using a Differential POLarization response (D-Pol) approach.

FIG. 2 illustrates the main components of a system 10 suitable for conducting the D-Pol and I-D-Pol methods as described hereinafter.

The system 10 receives an input optical signal p to be characterized. It comprises a polarization controller, in this case a polarization scrambler 12, placed before a polarization beam splitter 14, a dual channel Optical Spectrum Analyser (OSA) 16, a spectrum processor 18 and a noise calculator 20.

The polarization scrambler 12 is typically controlled by a control unit (not shown) which commands a variation of the state-of-polarization analysis conditions between acquisitions of samples $p_A$ and samples $p_B$.

Due to the different polarization properties of the signal contribution s and the noise contribution n, the insertion of a polarization beam splitter 14 in the optical path of the input optical signal p has a different effect on the noise contribution than on the signal contribution. The polarization beam splitter 14 is used to obtain two orthogonally-analyzed samples $p_A$ and $p_B$ of the input optical signal p.

The OSA 16 simultaneously acquires two polarization-analyzed optical spectrum traces ($Pa(\lambda)$), $P_A(\lambda)$ and $P_B(\lambda)$ respectively of the two samples $p_A$ and $p_B$. As a consequence of the orthogonal polarization-analysis conditions between the two samples $p_A$ and $p_B$, the acquired traces $P_A(\lambda)$ and $P_B(\lambda)$ are different. The case where the OSNR is null on one of the acquired traces, i.e. the signal is completely suppressed, is a special case but it should be emphasized that neither the D-Pol approach nor the I-D-Pol approach described hereinafter require such a condition.

It should be noted that the combination of the polarization beam splitter 14 and the dual channel OSA 16 composes a polarization diversity OSA 22 (see, for example, the polarization-diversity OSA described in commonly-owned U.S. Pat. No. 6,636,306 and commercially available as EXFO's FTB-5240).

The spectrum processor 18 receives the two traces $P_A(\lambda)$, $P_B(\lambda)$ and discriminates the noise contribution and the signal contribution. As will be described hereinbelow, the discrimination may be performed by subtracting the traces from one another to remove the noise contribution and provide a differential polarization response that is related to the optical spectrum of the signal contribution $S(\lambda)$ by a constant of proportionality. By estimating this constant of proportionality, the optical spectrum of the signal contribution $S(\lambda)$, and thus the optical spectrum of the noise contribution $N(\lambda)$ can be estimated. The difficulty therefore resides in estimating this constant of proportionality. It should be noted that a linear processing, such as filtering, linear transformation into another domain, etc., can be applied to the original traces $P_A(\lambda)$, $P_B(\lambda)$ before applying the herein presented processing.

The noise calculator 20 evaluates the in-band noise from the discriminated optical noise $N(\lambda)$. The OSNR or any other in-band noise parameter can then be calculated using the discriminated noise $N(\lambda)$ and signal $S(\lambda)$.

It is noted that the system illustrated in FIG. 2 is given as an example only of a suitable system for applying the D-Pol and I-D-Pol approaches described herein and that components or combination of components described may be replaced by any other components or combination of components which performs the functions required for the application of a D-Pol approach.

Differential POLarization Response (D-Pol) Approach

The D-Pol approach will now described in more detail.

Figure 3:
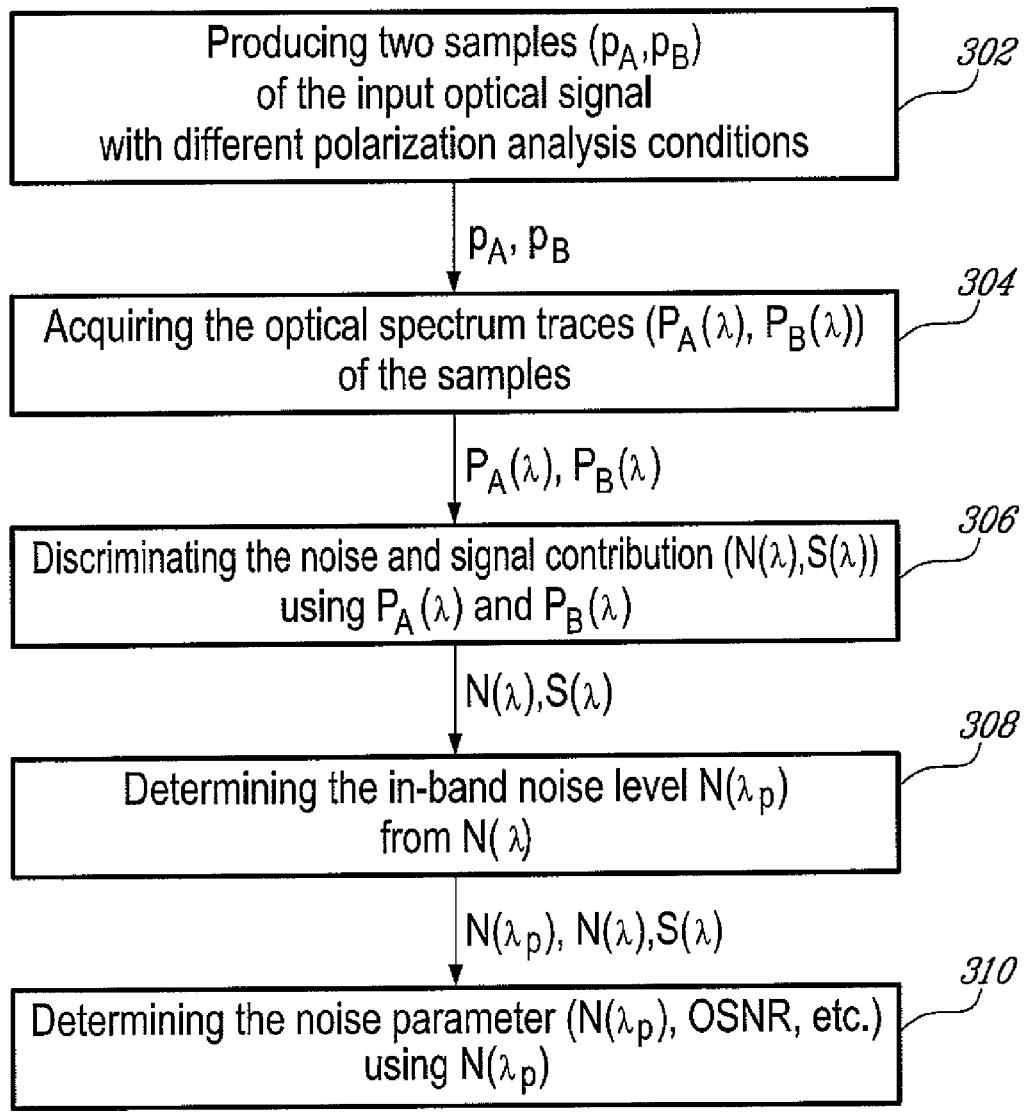
FIG. 3 is a flow chart illustrating a method for determining a noise parameter on an input optical signal using a D-Pol approach.

FIG. 3 illustrates generally the D-Pol approach for determining a noise parameter on an input optical signal. In step 302, the two samples $p_A$ and $p_B$ are produced from the input optical signal p using mutually-orthogonal state-of-polarization analysis conditions. The two polarization analysis conditions and thus the two samples $p_A$ and $p_B$ may be produced for example by the polarization beam splitter 14 (see FIG. 2). It is noted that the two state-of-polarization analysis conditions may be completely arbitrary relative to the polarization of the signal contribution to the input optical signal p. In step 304, the pair of mutually-orthogonal optical spectra $P_A(\lambda)$ and $P_B(\lambda)$, respectively, of the two samples $p_A$ and $p_B$ are acquired, typically using an OSA 16 (see FIG. 2). It is noted that the signal contribution, as well as the noise contribution, is generally split among the two samples $p_A$ and $p_B$. In step 306, the noise N and signal S contributions are discriminated using the acquired traces $P_A(\lambda)$ and $P_B(\lambda)$, by the spectrum processor 18 for example (see FIG. 2). Embodiments of this step are described in more detail below. In step 308, the in-band noise level $N(\lambda)$ is determined from N. This step is performed, for example, by the in-band noise calculator 20 (see FIG. 2). In step 310, the noise parameter, i.e. the in-band noise, the OSNR, the BER, the electrical signal-to-noise ratio etc., is determined using the in-band noise level $N(\lambda)$ and is typically output. The thereby determined noise parameter is output for use, for example, in monitoring, maintenance or troubleshooting of a DWDM optical system. For example, the noise parameter can be output by graphical display, by printing, by generating an electrical signal or by storing it in memory for later retrieval. The in-band noise or the OSNR can also be graphically or numerically output using a display unit or a printer, along with, for example, the individual acquired spectrum traces and their sum ($P_A(\lambda)$, $P_B(\lambda)$, $P(\lambda)$). Other parameters can also be displayed or otherwise output in a graphical or numerical form. The in-band noise level may also be output for optical signal processing or for determining the noise figure of an optical amplifier, for example.

The determination of the in-band noise or the OSNR of an input optical signal p in a DWDM optical system using the D-Pol approach is now explained in more detail. Although the following analysis assumes for simplicity that Polarization Mode Dispersion (PMD) along the optical telecommunication link can be neglected, the D-Pol approach will yield acceptable results even in the case where a certain degree of PMD is present, as discussed hereinafter. This D-Pol approach also assumes that the noise contribution is mostly unpolarized, such as is normally the case for typical amplified spontaneous emission (ASE) noise present in state-of-the-art telecommunication links.

Figure 4:
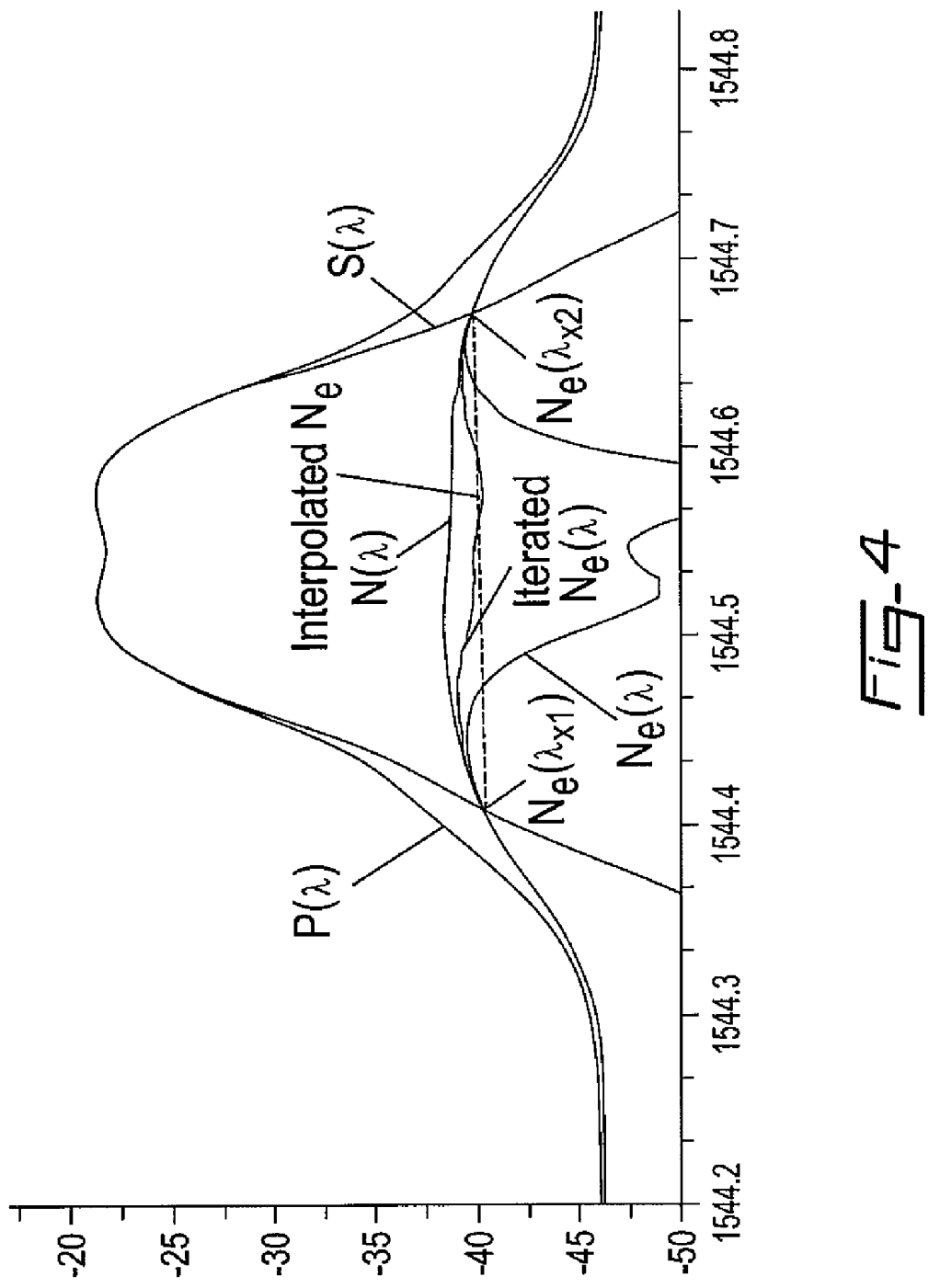
FIG. 4 is a graph showing a measured optical spectrum $P(\lambda)$ corresponding to an 10-Gbit/s input optical signal as filtered with multiple Reconfigurable Optical Add-Drop Multiplexers (ROADMs), as well as initially unknown optical spectra of the data-carrying signal contribution $S(\lambda)$ and the noise contribution $N(\lambda)$ and estimation thereof obtained using the D-Pol approach.

FIG. 4 shows a measured optical spectrum $P(\lambda)$ corresponding to an 10-Gbits/s DWDM optical signal filtered with multiple cascaded Reconfigurable Optical Add-Drop Multiplexers (ROADMs), as well as initially unknown optical spectra of the data-carrying signal contribution $S(\lambda)$ and the noise contribution $N(\lambda)$ and estimations of the noise contribution $N(\lambda)$ obtained using the D-Pol approach as explained hereinafter.

The measured optical spectrum $P(\lambda)$ comprises the signal contribution $S(\lambda)$ and the noise contribution $N(\lambda)$ such that:

$$P(\lambda)=S(\lambda)+N(\lambda). \quad (2)$$

The respective contributions of the signal $S(\lambda)$ and noise $N(\lambda)$ are not initially known and these are yet to be estimated. As described above, two samples $p_A$ and $p_B$ are produced from the input optical signal p using mutually-orthogonal state-of-polarization analysis conditions. The pair of mutually-orthogonal optical spectra $P_A(\lambda)$ and $P_B(\lambda)$, respectively corresponding to the two samples $p_A$ and $p_B$, are acquired. The signal contribution, as well as the noise contribution, is split among the two samples $p_A$ and $p_B$ such that one of the two optical spectra $P_A(\lambda)$ and $P_B(\lambda)$ generally comprises a larger proportion of the signal contribution. The spectrum $P_A(\lambda)$ or $P_B(\lambda)$ exhibiting the larger proportion of the signal contribution will be referred to hereinafter as $P_>(\lambda)$, while the other will be referred to as $P_<(\lambda)$, such that:

$$P(\lambda)=P_{sum}(\lambda)=P_>(\lambda)+P_<(\lambda) \quad (3)$$

Exceptionally, a polarization-analysis condition leading to $P_>(\lambda)$ and $P_<(\lambda)$ being equal may occur, in which case the data acquisition may be repeated with a different polarization-analysis condition on the input signal p by varying the setting of the polarization scrambler 12 (see FIG. 2) or by, for instance, disturbing the input optical signal p to provide a small change in its polarization condition, and then repeating the data acquisition.

As mentioned above, the case where the OSNR is null on one of the acquired optical spectra $P_>(\lambda)$, $P_<(\lambda)$, i.e. the signal is completely suppressed, is a special case, but it should be appreciated that the methods described herein as well as other embodiments do not require such a condition.

It is noted that the absolute value of the measured power of the optical spectrum traces depends upon the Resolution B and Width (RBW) of the OSA. By convention, the acquired optical spectrum traces are generally normalized to a RBW of 0.1 nm in the data processing, even though the raw data generally corresponds to a narrower RBW, for instance approximately 0.065 nm in the case of the aforementioned FTB-5240 OSA offered commercially by EXFO Inc.

Let the parameter κ be defined representing the portion of the signal contribution $S(\lambda)$ that is measured in $P_>(\lambda)$. Using this and assuming that the noise contribution is unpolarized, we can express:

$$P_>(\lambda)=\kappa S(\lambda)+0.5N(\lambda) \quad (4a)$$

and, by extension:

$$P_<(\lambda)=[1-\kappa]S(\lambda)+0.5N(\lambda). \quad (4b)$$

It is noted that κ used herein is related to the k and K values of Gariépy et al. (supra) by the relations k=(1−κ)/κ and K=1/(2κ−1).

If we assume little or no link PMD, κ is constant in wavelength within the optical signal bandwidth (e.g. approximately 40 GHz for a 40-GBaud signal). With these expressions, a differential polarization response $S'(\lambda)$ of the spectrum can now be defined and readily calculated from the acquired optical spectrum traces:

$$S'(\lambda)=P_>-P_<=(2\kappa-1)S(\lambda). \quad (5)$$

Now, if we assume that the signal contribution is largely higher than the noise contribution at the peak wavelength $\lambda_p$ corresponding to the maximum of the signal, i.e. $S(\lambda_p) \gg N(\lambda_p)$, then the parameter κ can be estimated:

$$\kappa \approx \kappa_e = P_>(\lambda_p)/P_{sum}(\lambda_p). \quad (6)$$

For most modulation schemes currently used in fiber-optic telecommunication links, this peak wavelength corresponds to a single signal peak which is generally located at or near the mid-point of the channel bandwidth. However, more generally, the parameter κ should be evaluated at or close to a wavelength where the signal contribution is at its peak power such that the noise contribution is minimal relative to the signal contribution.

By inserting Eq. (6) into Eq. (5) one obtains:

$$S(\lambda) \approx S_e = S'(\lambda)/(2\kappa_e-1), \quad (7)$$

and combining (7) with (2) then yields:

$$N(\lambda) \approx N_e(\lambda) = P_{sum}(\lambda) - S'(\lambda)/(2\kappa_e - 1). \quad (8)$$

An example result of this first-order estimation of the noise contribution $N_e(\lambda)$ is shown in FIG. 4. From Eq. (8), it is clear that the noise value calculated near the peak wavelength $\lambda_p$ is likely to be unreliable, since the zeroth-order estimation of $\kappa$ in Eq. (6), i.e. $\kappa_e$, assumes a zero noise at this peak wavelength, and consequently $N_e(\lambda_p) = 0$. However, as illustrated in FIG. 4, at wavelengths significantly away from the peak wavelength but still within the optical signal bandwidth, and hence still considered to be in-band, the error is generally minimal.

For instance, at the cross-over wavelengths $\lambda_x$, where $N_e(\lambda_x) = S_e(\lambda_x)$, Eq. (8) can be rearranged to give:

$$S'(\lambda_x) \approx P_{sum}(\lambda_x)[(2\kappa - 1)/2] \quad (9)$$

From the acquired data, we know the curves for $P_{sum}(\lambda)$ and $S'(\lambda)$, and hence the cross-over wavelength $\lambda_x$ can be readily determined. In one embodiment, two values $\lambda_{x1}$ and $\lambda_{x2}$, one on each side of the signal peak, are used. The noise level at $\lambda_x$ is then simply given by Eq. (8). As an example, for $S(\lambda_p)/N(\lambda_p)$ of 100 (20 dB), the associated error on $N(\lambda_{x1})$ and $N(\lambda_{x2})$ is less than about 0.05 dB.

Accordingly, in one embodiment, the in-band noise between $\lambda_{x1}$ and $\lambda_{x2}$, for example at $\lambda_p$, is determined by interpolating a linear function between $N(\lambda_{x1})$ and $N(\lambda_{x2})$, thereby providing a zeroth-order noise estimate $N_e(\lambda_p)$.

In one embodiment, an improved zeroth-order estimate $\kappa_e'$ is obtained by using this interpolated approximate noise value in Eqs. (2) and (6). From this improved estimate $\kappa_e'$, a more accurate value of $N(\lambda_p)$ is obtained.

This process may be iterated further until the noise value converges to a stable value to obtain a first-order noise value close to the peak wavelength. In practice, typically only one iteration is required. More sophisticated signal processing algorithms and some assumptions about the noise curve behavior may be used as well. Using such an iterative process, the optical spectrum of the noise contribution $N(\lambda)$ may be determined within the optical signal bandwidth in cases where PMD does not significantly influence the SOP as a function of wavelength within the signal bandwidth. Hence, this condition is more easily satisfied with 10-GBaud signals than with 40-GBaud signals, since the former are spectrally narrower than the latter.

Further, from Eqs. (2-3), the signal level $S(\lambda)$ is obtained:

$$S(\lambda) = P_{sum}(\lambda) - N(\lambda) \quad (10)$$

Consequently, the optical signal-to-noise-ratio within the channel optical bandwidth can be expressed as:

$$\text{OSNR} = \int_{CBW} S(\lambda) d\lambda / N_{ref}, \quad (11)$$

where CBW is the effective channel optical bandwidth and $N_{ref}$ is the integrated noise in the standard 0.1-nm RBW at the center of the channel.

Alternately, it is also possible to calculate the overall channel OSNR ($\text{OSNR}_{ch}$), i.e. the actual optical signal-to-noise ratio as would be seen by a receiver in a transmission system after the channel was demultiplexed. The $\text{OSNR}_{ch}$ can be defined as:

$$\text{OSNR}_{ch} = \int_{CBW} S(\lambda) d\lambda / \int_{CBW} N(\lambda) d\lambda \quad (12)$$

By assuming a constant noise within the channel bandwidth, this simplifies to:

$$\text{OSNRch} = \int_{CBW} S(\lambda) d\lambda / [\text{Nref} \cdot (CBW/0.1 \text{ nm})] \quad (13)$$

In another embodiment, the electrical noise in the detected radio-frequency baseband arising from the input optical signal, comprising principally signal-ASE beat noise and ASE-ASE beat noise, is calculated directly from $S(\lambda)$ and $N(\lambda)$, and hence circumvents an explicit OSNR determination. Such an input-optical-signal-related electrical noise measurement may be very useful, for instance, for isolating those electrical noise sources in a commercial telecom optical receiver that are not directly related to the detected optical signal, e.g. due to imperfections or misadjustments within the receiver itself. For instance, one may surmise that a difference in the actually measured electrical noise and the calculated noise, as described above, derives from such imperfections or misadjustments.

It is noted that in principle, the acquisition of a single pair of mutually-orthogonal samples is sufficient to obtain a reliable estimation of the in-band noise using the D-Pol approach. Accordingly, in one embodiment, a single pair of samples is used. It this case, measurement errors increase as the difference between $P_>(\lambda)$ and $P_<(\lambda)$ decreases, which occurs when the signal contribution $S(\lambda)$ is more equally split among the two samples.

Alternately, in another embodiment, more that one pair of samples is produced and a plurality of pairs of optical spectra $P_>(\lambda)$ and $P_<(\lambda)$ are acquired. The method then selects the pair of mutually-orthogonal optical spectra $P_>(\lambda)$ and $P_<(\lambda)$ exhibiting the largest difference and the D-Pol method described above or any other embodiment thereof is performed with the selected pair of spectra. In this case, for instance, the SOP analysis condition is varied using the polarization scrambler 12 (see FIG. 2). When PMD-induced effects are not significant within the signal bandwidth, generally only eight or even less, randomly chosen SOP analysis conditions are used to obtain an OSNR measurement for each of a plurality of DWDM channels. For practical reasons related to the synchronicity of the acquisition of the mutually-orthogonal samples of a pair, it is generally desirable that the SOPs not be varied significantly during the time of an acquisition scan across a particular DWDM channel. Accordingly, in one embodiment, the SOP is changed punctually between each acquisition scan and remains fixed throughout the acquisition of the optical spectra $P_>(\lambda)$ and $P_<(\lambda)$. In another embodiment, the SOP is varied on a time scale that is slow compared with the OSA scanning speed within an individual DWDM channel, such that the SOP analysis condition does not change significantly across the channel bandwidth, due to scrambling, but does change significantly over the time taken to scan over the entire DWDM spectral region, such as the entire telecommunication C-band for example.

It should be noted that if significant PMD is present, there may be some apparent partial depolarization of the input signal due to the non-zero slit width of the optical spectrum analyzer. However, the D-POL approach by estimating a constant of proportionality at the peak wavelength ($\lambda_p$) is not affected by such resulting depolarization. Further, this can be minimized by employing a sufficiently narrow effective slit width. For example, for a slit width corresponding to an OSA resolution bandwidth of 0.05 nm in the telecommunications C-band (i.e. 1530-1565 nm) and a PMD of about 15 ps, the D-Pol approach still allows measurement of an OSNR of up to 20 dB within an accuracy of 0.5 dB or less for both 10-GBaud and 40-GBaud signals. However, in practice, a PMD value of 15 ps would be very high and is rarely present in most commissioned optical fiber links that are designed for high-bandwidth transmission.

One skilled in the art will understand that a great number of variations of the aforedescribed method are possible. The method described herein should therefore not be interpreted as being limitative. For instance, since $P_>(\lambda)$, $P_<(\lambda)$, and $P_{sum}(\lambda)$ are inter-related by Eq. (3), measurement of any two of them would provide sufficient information to carry out a suitably modified version of this method.

Although the D-Pol approach offers many performance advantages, notably with respect to the active polarization-nulling approach, there are certain limitations.

A limitation of the aforedescribed D-Pol approach may arise when the optical channel comprising the signal and noise to be characterized is tightly-filtered, as may be the case when the signal path includes multiple intervening filters, such as may be the case for DWDM signals in ROADM-enabled mesh networks. From Eq. (8) above, direct determination of the noise contribution is limited to wavelengths in the vicinity of the cross-over wavelengths ($\lambda_{x1,2}$). By then employing the above-described iterative procedure, $N(\lambda)$ may be reliably extended slightly closer to the signal peak which is usually found at the channel center. However, extension of the noise curve much closer to the signal peak via interpolation or intelligent curve-fitting may be unreliable, especially when the optical signal bandwidth is approximately equal to or greater than the pass-band of the filter.

Figure 5:
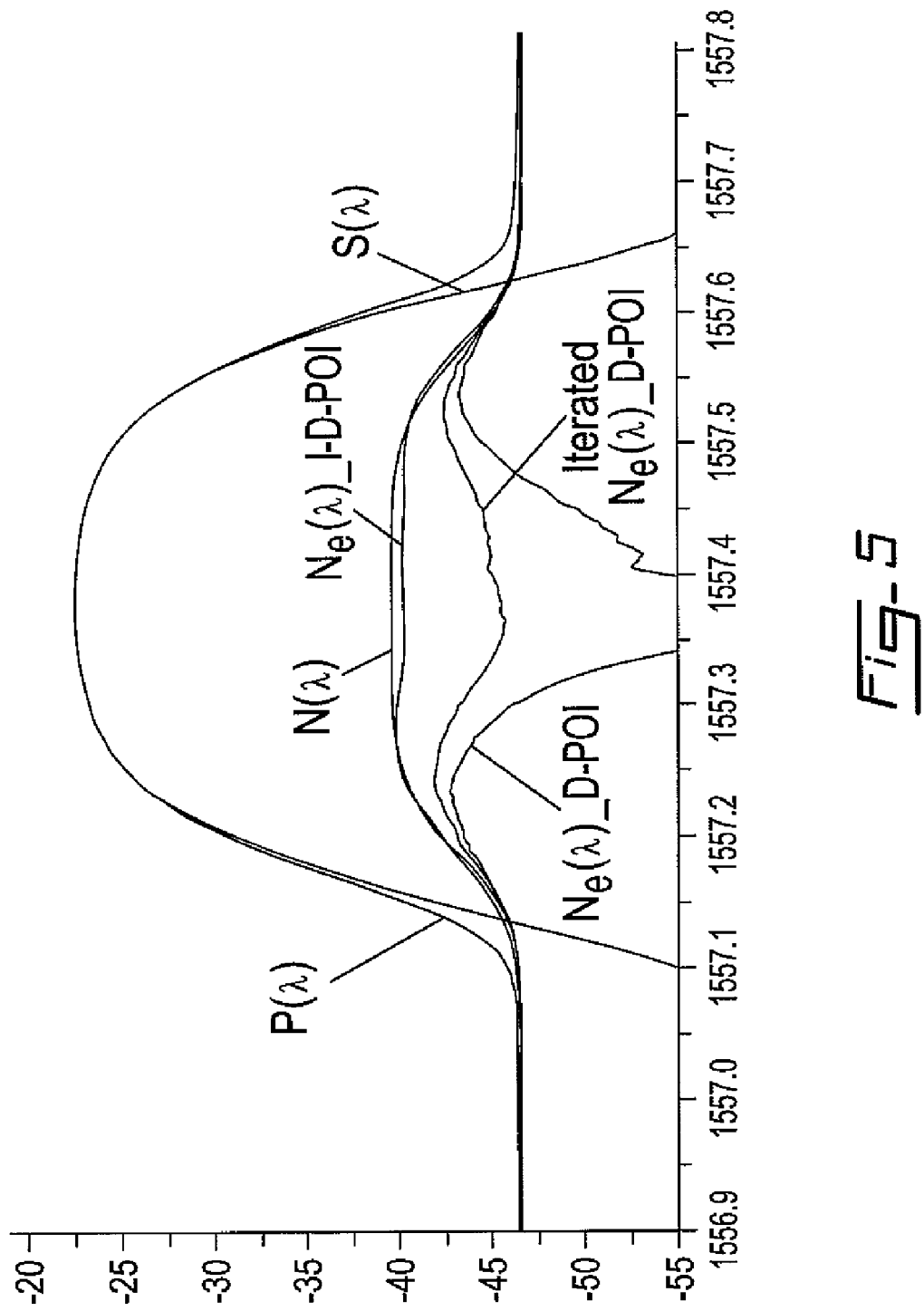
FIG. 5 is a graph showing a measured optical spectrum $P(\lambda)$ corresponding to an 40-Gbit/s input optical signal as filtered with multiple Reconfigurable Optical Add-Drop Multiplexers (ROADMs), as well as initially unknown optical spectra of the data-carrying signal contribution $S(\lambda)$ and the noise contribution $N(\lambda)$ and estimation thereof obtained using the D-Pol and the I-D-Pol approaches.

An example of this condition is illustrated in FIG. 5 which shows an example measurement made on a real 40-G ROADM system with multiple cascaded ROADM filters. The measured optical spectrum $P(\lambda)$ is plotted, as well as initially unknown optical spectra of the signal contribution $S(\lambda)$ and the noise contribution $N(\lambda)$ and optical spectrum of noise estimated using the zeroth-order D-Pol method described herein "$N_e(\lambda)\_D\text{-Pol}$", the D-Pol method described herein with one iteration "iterated $N_e(\lambda)\_D\text{-Pol}$", and a I-D-Pol method as described hereinafter "$N_e(\lambda)\_I\text{-D-Pol}$".

Another limitation may arise in the presence of strong PMD. The ratio $P_<(\lambda)/P_>(\lambda)$ and, consequently, the resulting reconstructed signal $S_e(\lambda)$ may exhibit a wavelength-dependent ripple. The reconstructed noise curve $N_e(\lambda)$ determined by Eq. (8), which is limited to wavelengths in the vicinity of the cross-over points, becomes less reliable for all but values very close to these two cross-over wavelengths.

Improved Differential POLarization Response (I-D-Pol) Approach

The I-D-Pol approach, described hereinafter in more detail, may be used to determine in-band noise throughout all or most of the optical signal bandwidth, without rendering the measurement time unduly long. Although the I-D-Pol approach exploits many elements of the D-Pol approach, it provides notable advantages and improvements and is henceforth referred to as the "Improved D-Pol" approach. It is noted that the I-D-Pol approach need not invoke assumptions or pre-existing knowledge of the shape of the optical spectrum of the noise contribution $N(\lambda)$. It allows estimation of the noise contribution $N(\lambda)$ for wavelengths between the cross-over wavelengths, i.e. throughout the useful optical signal bandwidth.

Compared to the D-Pol approach described herein, the I-D-Pol approach provides an alternative way to estimate the parameter $\kappa$ that is not based on data measured at a particular wavelength, e.g. $\lambda_P$, at or near the signal peak. The I-D-Pol approach also does not presuppose that the underlying noise over a central region, e.g. between the left and right cross-over wavelengths $\lambda_{x1,2}$, is spectrally flat or of an a priori known shape. Rather, the I-D-Pol approach employs an ab initio statistical approach for deriving an estimated value of $\kappa$, i.e. $\kappa_e$, as a function of a sufficiently large number $n_{SOP}$ of varied input SOPs, wherein the characteristics of this SOP distribution are assumed to be approximately known. Once $\kappa_e$ has been determined, one can directly estimate the optical spectrum of the noise contribution $N_e(\lambda)$ throughout the entire signal bandwidth. In many embodiments described herein, the distribution is assumed to be approximately uniformly distributed on the Poincaré polarization sphere. However, it should be noted that in alternate embodiments, this will not necessarily be the case although the characteristics of the distribution are preferably approximately known.

Figure 6:
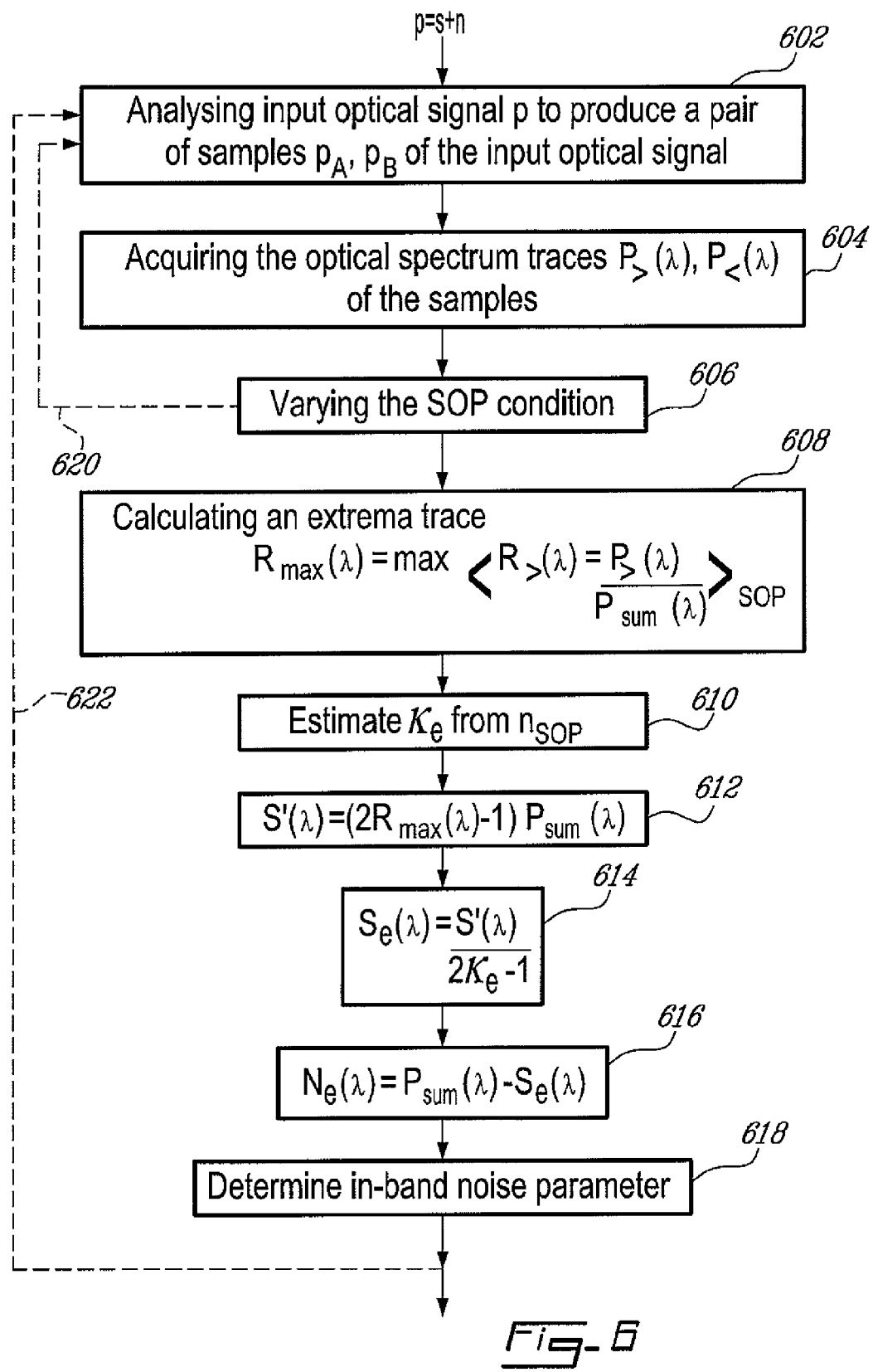
FIG. 6 is a flowchart illustrating a method for determining a noise parameter on an input optical signal using an I-D-Pol approach.

FIG. 6 illustrates an embodiment of a method for determining a noise parameter on an input optical signal using the I-D-Pol approach. As in the D-Pol method described above, in step 602, the two samples $p_A$ and $p_B$ are produced from the input optical signal p using mutually-orthogonal state-of-polarization analysis conditions, implemented, for example, by the polarization beam splitter 14 (see FIG. 2). It is noted that the two (orthogonal) SOP analysis conditions may be completely arbitrary relative to the SOP of the signal contribution comprised in the input optical signal p. In step 604, the simultaneously (contemporaneously) acquired mutually-orthogonal optical spectra, $P_>(\lambda)$ and $P_<(\lambda)$, respectively, of the greater and lesser of the two samples $p_A$ and $p_B$ are acquired, typically using a polarization-diverse OSA 16 (see FIG. 2). The optical spectrum traces $P_>(\lambda)$ and $P_<(\lambda)$ are typically acquired across the lesser of the signal bandwidth and the DWDM channel bandwidth, and the measurement is made using an OSA having a RBW less, preferably significantly less, than the signal bandwidth.

In step 606, the SOP analysis condition is varied, typically by means of the polarization scrambler 12 (see FIG. 2), and steps 602 and 604 are repeated (arrow 620) until a number $n_{SOP}$ of pairs of mutually-orthogonal optical spectra $P_>(\lambda)$ and $P_<(\lambda)$ is acquired. As mentioned before, the $n_{SOP}$ SOP analysis conditions are assumed to be approximately uniformly distributed on the Poincaré sphere.

In steps 608, 610, 612, 614 and 616, the noise N and signal S contributions are discriminated using the acquired mutually-orthogonal spectra $P_>(\lambda)$ and $P_<(\lambda)$, by the spectrum processor 18 (see FIG. 2) for example. Steps 608, 610, 612, 614 and 616 are described below. In step 618, the noise parameter, e.g. the in-band noise, the OSNR, the BER or the electrical signal-to-noise ratio, is determined using from the discriminated noise N and signal S contributions and is typically output as described hereinbefore.

As in the D-Pol method, in order to discriminate the noise N and signal S contributions, a differential polarization response $S'(\lambda)$ is defined. The differential polarization response $S'(\lambda)$ is related by a constant of proportionality, which is calculated from the parameter $\kappa$, to the optical spectrum of the signal contribution $S(\lambda)$ within said optical signal bandwidth. By estimating the parameter $\kappa$, the optical spectrum trace of the signal contribution $S(\lambda)$ and hence also that of the noise contribution $N(\lambda)$ may be estimated.

In step 608, in order to define the differential polarization response $S'(\lambda)$, an extrema trace, for example a maxima trace $R_{max}(\lambda)$ or a minima trace $R_{min}(\lambda)$ of normalized optical spectra corresponding to the $n_{SOP}$ pairs of polarization-analyzed mutually-orthogonal optical spectra $P_>(\lambda)$ and $P_<(\lambda)$ is calculated. In this embodiment, for each pair of said mutually-orthogonal spectra, a normalized optical spectra $R_>(\lambda)$ is obtained by normalizing the optical spectra $P_>(\lambda)$ against the sum of $P_>(\lambda)$ and $P_<(\lambda)$, i.e. $P_{sum}(\lambda)$. An extrema trace $R_{max}(\lambda)$ corresponding to the $n_{SOP}$ acquisitions is then obtained by evaluating the maximum value $R_{max}(\lambda_i)$ for each of wavelengths $\lambda_i$ among the normalized traces $R_>(\lambda_i)$ as follows:

$$R_{max}(\lambda) = \max \langle R_>(\lambda) \rangle_{SOP} = \max \langle P_>(\lambda)/P_{sum}(\lambda) \rangle_{SOP}. \quad (14)$$

Accordingly, in this embodiment, the extrema trace $R_{max}$'($\lambda$) is evaluated at each acquisition wavelength or across a subset of the acquisition wavelengths.

If little or no PMD is present along the signal path, one may consider another embodiment which is easier to understand in terms of the significance of the extrema trace $R_{max}$'($\lambda$). In this embodiment, the extrema trace $R_{max}$'($\lambda$) is obtained by identifying the one of the normalized traces among the acquired $n_{SOP}$ pairs of optical spectra which shows a maximum signal peak. The extrema trace $R_{max}$'($\lambda$) then corresponds to the optical spectra $P_>(\lambda)$, for which the SOP analysis condition is the more closely aligned with the SOP of the signal, and thereby to the optical spectrum trace $P_<(\lambda)$ where the signal contribution is the most suppressed. An analogy may then be made to the active polarization-nulling approach where the SOP is scrambled until the signal is completely suppressed. It should be emphasized, however, that in the case of the I-D-Pol approach, unlike the polarization-nulling approach, it is not required that the signal be substantially or completely suppressed in any of the polarization-analyzed mutually-orthogonal optical spectra $P_>(\lambda)$, $P_<(\lambda)$. The non-perfect alignment of the SOP of the signal in the extrema trace $R_{max}$'($\lambda$) is compensated for by the parameter $\kappa$ as follows.

Referring again to the embodiment of FIG. 6, the extrema trace $R_{max}(\lambda)$ is rather evaluated wavelength by wavelength in order to construct a composite extrema trace. Such construction of a composite extrema trace permits significant compensation for certain signal impairments, notably PMD, which may otherwise lead to a wavelength dependent error on the reconstructed signal $S'(\lambda)$.

In step 610, instead of estimating $\kappa$ from the value at the signal peak ($\lambda_p$), as was done hereinbefore in the D-Pol method, the parameter $\kappa$ is estimated by performing a statistical calculation to provide an ab initio estimate of the $\kappa$ value from the probability density function for $\kappa$ as a function of the number and/or distribution of the SOPs on the Poincaré sphere. In particular, when the SOPs are independently and uniformly distributed on the Poincaré sphere, the expectation value $\mu$ of the calculated probability density function yields the following (ab initio) estimate $\kappa_e$, as a function of the number $n_{SOP}$ of different SOP values:

$$\kappa \approx \kappa_e = 0.5[(2n_{SOP}+1)/(n_{SOP}+1)] \quad (15)$$

In other words, the value of $\kappa_e$ is representative of the fact that the higher the number $n_{SOP}$, the higher the chance that one of the optical spectrum traces $P_>(\lambda)$, $P_<(\lambda)$ will be acquired with a SOP that is close to the SOP of the signal. Accordingly, the higher the number $n_{SOP}$, the more closely $\kappa$ approaches 1. Henceforth, the constant of proportionality can be estimated from a probabilistic calculation which assumes a large number of polarization-analyzed optical spectrum traces (Pa($\lambda$)).

In step 612, from the definition in Eq. (14) of the extrema trace $R_{max}(\lambda)$, the differential polarization response $S'(\lambda)$ may be defined as follows:

$$S'(\lambda)=(2R_{max}(\lambda)-1) \times P_{sum}(\lambda).$$

In step 614, the optical spectrum of the signal contribution $S(\lambda)$ is estimated:

$$S(\lambda) \approx S_e(\lambda) = S'(\lambda)/(2\kappa_e - 1),$$

and in step 616, the optical spectrum of the noise contribution $N(\lambda)$ is estimated:

$$N(\lambda) \approx N_e(\lambda) = P_{sum}(\lambda) - S_e(\lambda), \quad (16)$$

where $P_{sum}(\lambda) = P_>(\lambda) + P_<(\lambda)$.

Finally, in step 618, the in-band noise parameter is determined. For example, the $OSNR_c$ may be calculated using:

$$OSNR_c = \int_{CBW} S_e(\lambda) d\lambda / \int_{ENBW} N_e(\lambda) d\lambda, \quad (17)$$

where ENBW is the equivalent noise bandwidth. For example, the reference $OSNR_{ref}$ and channel $OSNR_{ch}$ for the particular DWDM channel-under-test can be obtained when ENBW=0.1 nm and ENBW=CBW, respectively.

It is noted that the embodiment denoted by arrow 620, steps 602 to 606 are repeated until the number $n_{SOP}$ of pairs of mutually-orthogonal optical spectra are acquired and the $n_{SOP}$ pairs are all acquired before performing the mathematical discrimination of $S(\lambda)$ and $N(\lambda)$ (steps 608 to 616). In another embodiment denoted by arrow 622, a first pair of mutually-orthogonal optical spectra is acquired and the composite extrema trace is constructed with this first pair ($n_{SOP}=1$). Accordingly, steps 602 to 606 are repeated to acquire a second pair of mutually-orthogonal optical spectra and the composite extrema trace is updated with the information of this iteratively acquired second pair ($n_{SOP}=2$). Steps 602 to 606 are repeated with a third, fourth, fifth, etc. pair in order to iteratively refine the constructed composite extrema trace and after any given number $n_{SOP}$ of acquisitions, steps 608 to 616 may be performed to obtain an estimate. Once a given number of iterations have been performed, corresponding to $n_{SOP}$ acquisitions, steps 608 to 616 may be performed to obtain an estimate of the optical spectrum of the noise contribution, an estimation of the optical spectrum of the signal contribution and thereby the estimation of the noise parameter. The uncertainty on the estimation decreases as the number $n_{SOP}$ increases. Steps 602 to 606 and 608 to 616 may thus be repeated until a given number $N_{SOP}$ of pairs is accumulated ($n_{SOP}=N_{SOP}$), on which the mathematical discrimination is performed, or until the uncertainty on the measurement becomes suitably low (as determined either in "real-time" by the operator, or by initially selected measurement parameters). The given number can thus be predetermined.

It should be noted that, employing the k and K definitions of Gariépy et al (supra), Eq. (16) may be alternatively expressed as:

$$k \approx 1/(2n_{SOP}+1) \quad (18a)$$

$$K \approx (n_{SOP}+1)/n_{SOP}. \quad (18b)$$

It should be appreciated that the use of an extrema ratio, i.e. a normalized value of the extrema value, in the aforedescribed method renders the OSNR determination less sensitive to variations in the power, i.e. on $P_{sum}(\lambda)$, of the input optical signal that may occur over the duration of the measurement procedure.

Similarly, the estimated noise curve $N_e(\lambda)$ may be re-cast as:

$$N_e(\lambda) = 2[P_>(\lambda) - \kappa_e S_e(\lambda)]; \text{ or}$$

$$N_e(\lambda) = 2[P_<(\lambda) - (1-\kappa_e)S_e(\lambda)]$$

Once the noise spectrum $N_e(\lambda)$ is obtained, the OSNR (according to any desired RBW convention), or the direct electrical signal—ASE beat noise, may be calculated across the signal bandwidth, as discussed before.

One skilled in the art will understand that there exist variants to the I-D-Pol method described hereinbefore that would lead to equivalent analysis. Hence, the herein described method should not be interpreted as being limitative.

Figure 11C:
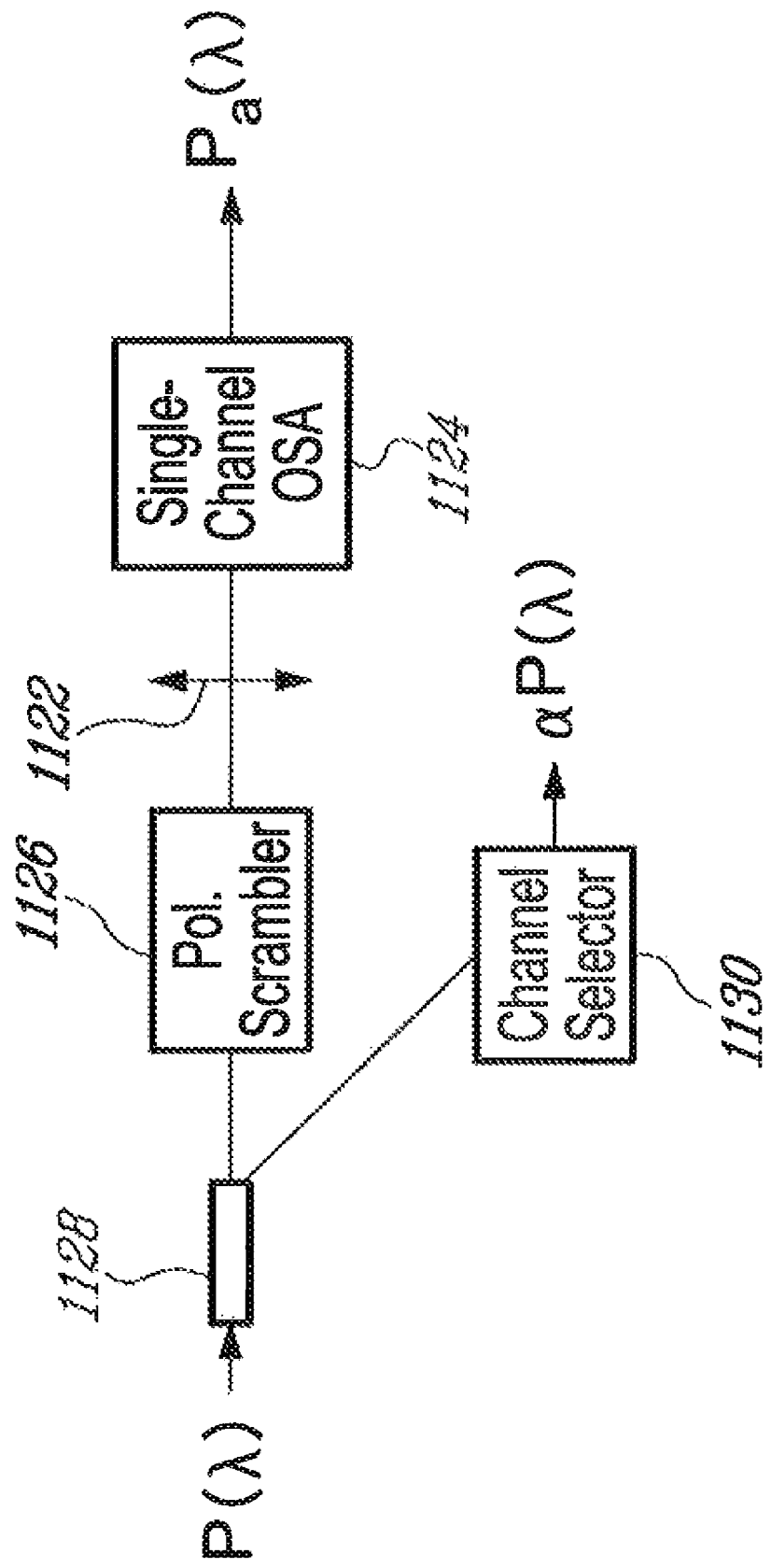

For instance, it is not necessary that a polarization-diverse OSA means be used for this method. In a first alternative (FIG. 11A), assuming that the input optical power does not vary during the measurement, a simple polarization analyzer 1102 (e.g. linear polarizer having known excess loss) could be disposed before the input of a single-channel polarization-independent OSA 1104 (or equivalently, a single channel of a polarization-diverse OSA). If, by employing a polarization controller 1106 before the analyzer, a sufficiently large number ($n_{SOP}$) traces are acquired, corresponding to SOP analysis conditions having a known distribution (e.g. uniform on the Poincaré sphere), then the maximum value at each wavelength (closely approximating the total power) and the minimum value at each wavelength can be used to carry out the above-described procedure.

In a second alternative (FIG. 11B), applicable for instance to a measurement apparatus comprising a dual-channel polarization-independent OSA 1114 wherein each channel A, B is polarization independent, a polarization controller 1116 and a beam splitter 118, polarization analyzer 1112 (e.g. linear polarizer having known excess loss) can be disposed before the input of one of the two channels, i.e. channel A, the second (non-analyzed) channel B being used to normalize the detected spectrum, thereby rendering the measurements substantially insensitive to variations in the input optical power.

In a third alternative (FIG. 11C) which uses a single-channel polarization-independent OSA 1124, a non-polarization-dependent beam-splitting means 1128 could be employed before a polarization analyzer 1122, either before or after a polarization scrambler 1126 to extract a portion of the input optical power, this power then being used for the normalization. (Details of the electrical connections and processing means have been omitted for clarity.) In this case, it generally would be necessary to filter this extracted light, using a channel selector 1130, so as to include only power from the DWDM channel under test by rejecting optical power from adjacent DWDM channels, for instance.

The three aforedescribed alternatives, can be realized by persons of ordinary skill in the art using algorithms derived from those described above with respect to I-D-Pol.

As for the analysis methods described hereinbefore, there are alternatives. For instance, in one embodiment, the method described is modified to use the extrema ratio $R_{min}(\lambda)$ where $$R_{min}(\lambda) = \min \langle R_<(\lambda) \rangle_{SOP} = \min \langle P_<(\lambda)/P_{sum}(\lambda) \rangle_{SOP}.$$

S'($\lambda$) may then be defined as:

$$S'(\lambda) = (1 - 2R_{min}(\lambda)) P_{sum}(\lambda)$$

$$\text{or} = (R_{max}(\lambda) - R_{min}(\lambda)) P_{sum}(\lambda)$$

As well, the extrema traces $R'_{max}(\lambda)$ and $R'_{min}(\lambda)$ may alternately be expressed as:

$$R'_{max}(\lambda) = \max<P_>(\lambda)/P_<(\lambda)>_{SOP}, \text{ and}$$

$$R'_{min}(\lambda) = \min<P_>(\lambda)/P_<(\lambda)>_{SOP}.$$

In a similar manner, S'($\lambda$) may be defined with the non-normalized acquired polarization-analyzed optical spectrum extrema traces, such as the non-normalized maxima trace ($Pa_{max}(\lambda)$) and/or non-normalized minima trace ($Pa_{min}(\lambda)$): $P_>(\lambda) = Pa_{max}(\lambda) = \max<Pa(\lambda)>_{SOP}$ and $P_<(\lambda) = Pa_{min}(\lambda) = \min<Pa(\lambda)>_{SOP}$ as $S'(\lambda) = P_{sum}(\lambda) - 2Pa_{min}(\lambda)$ $$\text{or} = Pa_{max}(\lambda) - Pa_{min}(\lambda)$$

$$\text{or} = 2Pa_{max}(\lambda) - P_{sum}(\lambda).$$

It should also be appreciated that, although preferred embodiments of the I-D-Pol method described herein have assumed an approximately uniform but random SOP distribution, distributions having other characteristics alternatively may be used. These may require different polarization control means to control the SOP of the optical signal impinging upon the polarizing analyzer. For such distributions, alternative probability density distributions can be derived and the $\kappa_e$ values deduced therefrom, as would be known to those skilled in the art.

FIG. 5 illustrates how the I-D-Pol approach can provide an accurate estimation of the optical spectrum of the noise contribution N($\lambda$) for 40 G DWDM signal, as provided with curve "$N_e(\lambda)$_I-D-Pol" obtained with the method of FIG. 6. The I-D-Pol approach allows for a reliable determination of the noise curve throughout the signal bandwidth.

The uncertainty of the I-D-Pol approach as described herein is now discussed.

The theoretical relative uncertainty, $\delta n(\lambda)$, associated with N($\lambda$), parameterized in terms of $n_{SOP}$, can be expressed as:

$$\delta n(\lambda)/N(\lambda) = \{2[(n_{SOP})/n_{SOP}]OSNR(\lambda)\}\Delta\kappa, \qquad (19)$$

where $\delta n(\lambda) = N(\lambda) - N_e(\lambda)$, $OSNR(\lambda) = S(\lambda)/N(\lambda)$ is the local OSNR at $\lambda$, and $\Delta\kappa = \kappa - \kappa_e$.

Considering the probability density function of the parameter $\kappa$, for those embodiments where the SOP distribution is assumed to be approximately uniform, the standard deviation $\sigma_n$ of $\delta n(\lambda)$, can be cast as:

$$\sigma_n/N(\lambda) = (1/n_{SOP})[n_{SOP}/(n_{SOP}+2)]^{1/2} \cdot OSNR(\lambda) \qquad (20)$$

$$\approx (1/n_{SOP})OSNR(\lambda)$$

Figure 7:
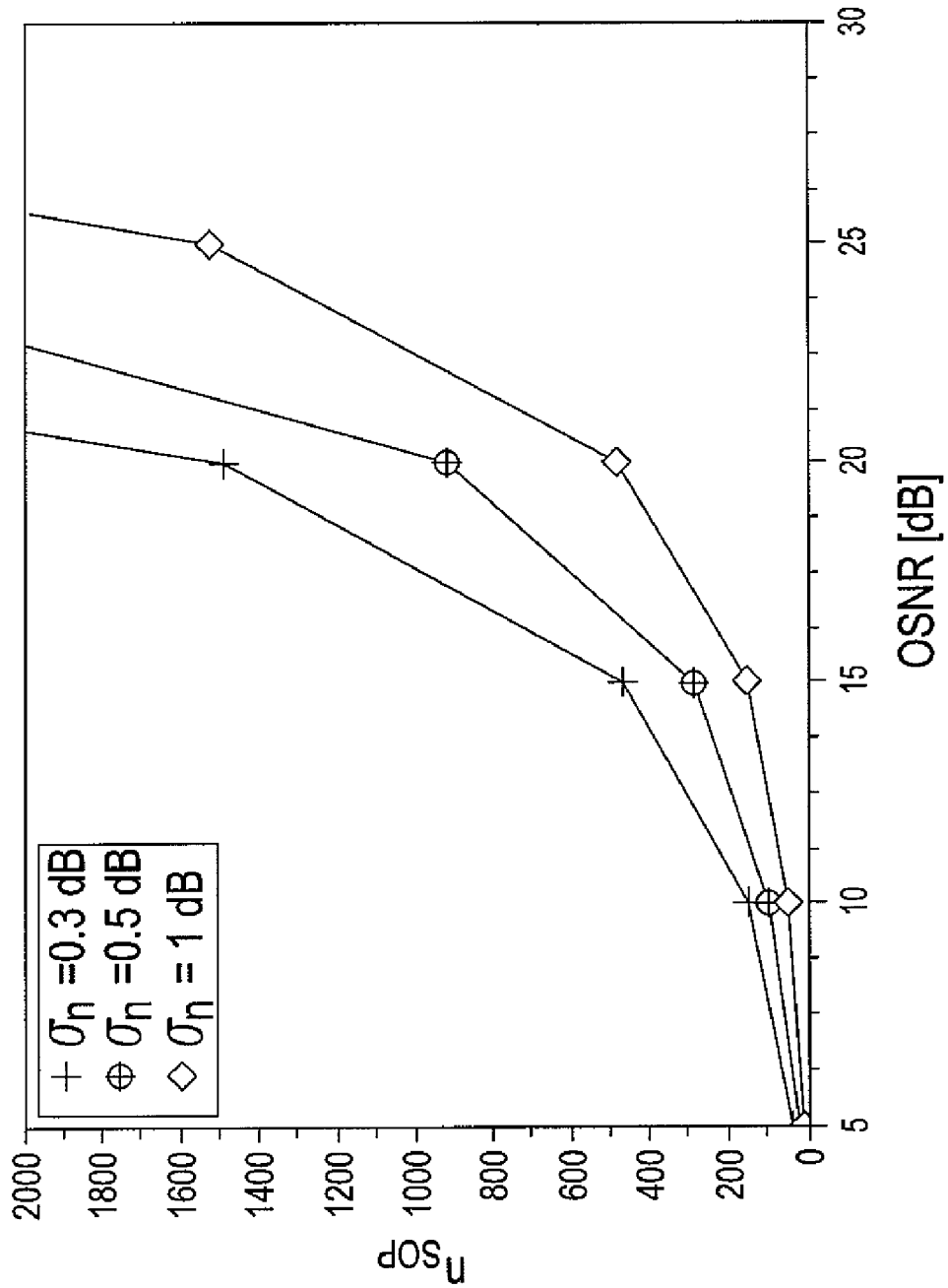
FIG. 7 is a graph showing the requirements in terms of the number $n_{SOP}$ of measurements of varied SOPs and in terms the Optical Signal-to-Noise Ratio (OSNR) to attain standard deviations of 0.3 dB, 0.5 dB and 1 dB using the I-D-Pol approach.

The standard deviation or uncertainty on the measurement of N($\lambda$) using $N_e(\lambda)$ is dependent upon both the number of SOPs ($n_{SOP}$) and the OSNR($\lambda$) at the particular wavelength $\lambda$. FIG. 7 shows the relation between the required $n_{SOP}$ and OSNR($\lambda$) to attain standard deviations of 0.3 dB, 0.5 dB and 1 dB, respectively. For example, when measuring an OSNR of 20 dB, a number $n_{SOP}$ of about 900 is required to obtain a standard deviation $\sigma_n$ of 0.5 dB.

Figure 8:
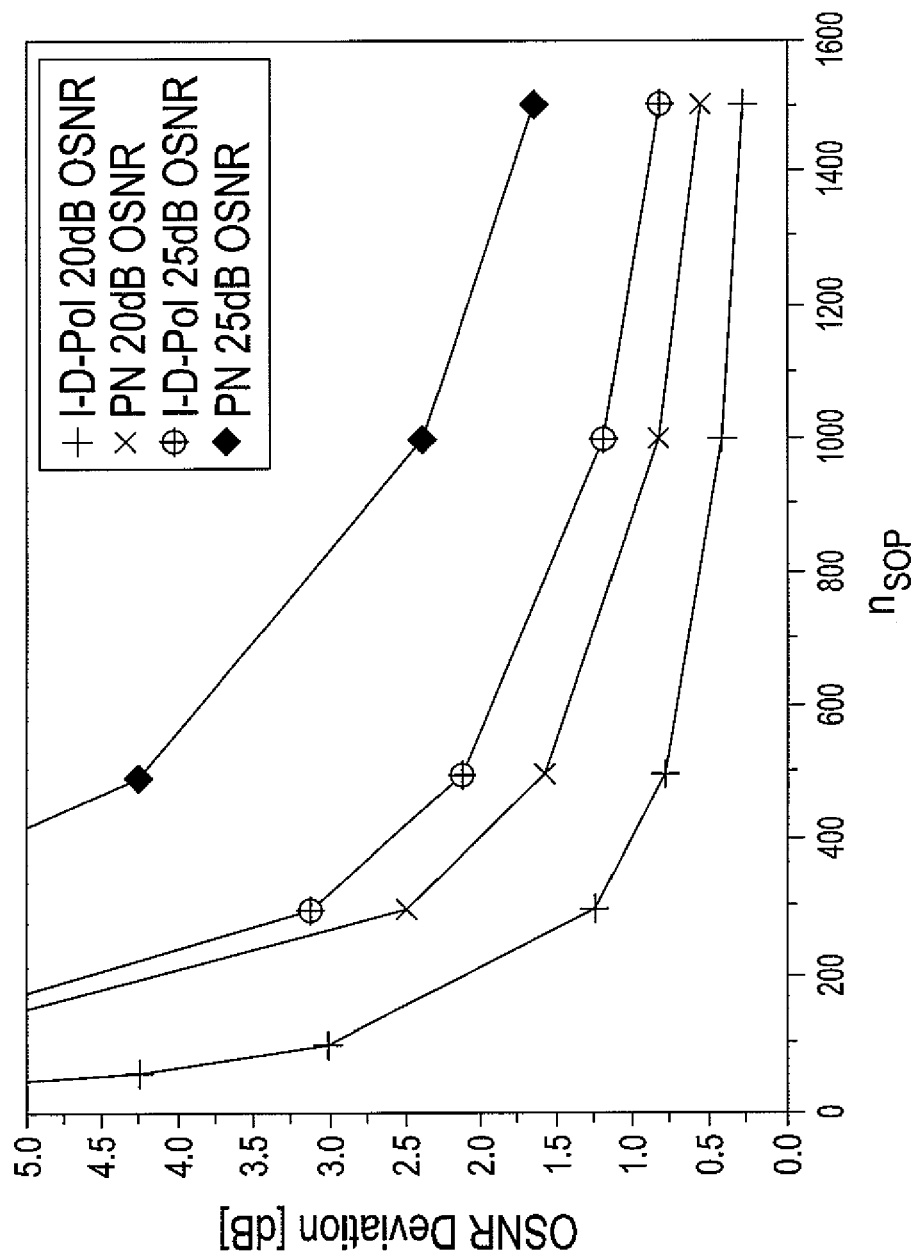
FIG. 8 is a graph showing the absolute value of the deviation of OSNR as a function of the number $n_{SOP}$ of varied SOPs corresponding to OSNR values of 20 dB and 25 dB, for both the active polarization-nulling approach (PN) and the I-D-Pol approach.

FIG. 8 shows the absolute value of the deviation of OSNR as a function of the number of SOPs ($n_{SOP}$) corresponding to OSNR values of 20 dB and 25 dB, for both the active polarization-nulling approach (PN) (see J. H. Lee et al., "OSNR Monitoring Technique Using Polarization-Nulling Method", IEEE Photonics Technology Letters, Vol. 13, No. 1, January 2001) and the 1-D-Pol approach. It shows that, in addition to providing the full noise spectral curve, the number of SOPs ($n_{SOP}$), and hence the measurement time, corresponding to a given OSNR uncertainty is smaller with the I-D-Pol approach than with the active polarization-nulling approach.

The I-D-Pol method embodiment detailed above employing the $\kappa_e$ value determined from Eq. (15), assumes that the scrambling of the SOPs of the $n_{SOP}$ pairs of traces $P_>(\lambda)$, $P_<(\lambda)$ is uniform, i.e. that the density of SOPs covered by the polarization scrambling is mostly equal on the Poincaré sphere. In practice, however, this is not a very stringent requirement for acceptable performance of the afore-described I-D-Pol method for realistic values of OSNR to be measured (e.g. <25 dB), even when $\kappa$ is estimated using Eq. (15), which was derived assuming a uniform SOP distribution. In many respects, when employing Eq. (15), it is the SOP coverage on the Poincaré sphere rather than its uniformity that is relevant, i.e. there should not be any significant empty zones or "holes" in the distribution of the SOPs on the Poincaré sphere. It is noted that, considering a random scrambling of the SOPs, as the number $n_{SOP}$ of pairs of traces $P_>(\lambda)$, $P_<(\lambda)$ increases, the probability of such holes in the SOP distribution on the Poincaré sphere decreases. Accordingly, in cases where the number $n_{SOP}$ is large, $n_{SOP} > 200$ for example, the assumption that the scrambling of the SOPs is uniform holds. In cases where the number $n_{SOP}$ is moderate, $50 > n_{SOP} > 100$ for example, it has been shown that with a random scrambling of the SOPs, the aforedescribed I-D-Pol method is not very sensitive to a non-uniform distribution of the SOPs on the Poincaré sphere.

In the embodiments of the D-Pol and the I-D-Pol approaches described herein, it is assumed that the noise contribution $N(\lambda)$ is unpolarized. It should be appreciated that these approaches are also valid in cases where the noise is mostly or substantially unpolarized. For example, a slight polarization of the noise contribution $N(\lambda)$ may arise in the presence of Polarization Dependent Loss (PDL) on the optical telecommunication link. In the presence of such PDL, the noise contribution is still considered as being mostly unpolarized and the D-Pol and the I-D-Pol methods described herein are still valid, with a measurement error due to the presence of PDL. It is estimated that the PDL-induced measurement error on the OSNR is of the order of the level of PDL. It should however be noted that, there exists at this time no accepted convention as to the definition of OSNR in the presence of PDL. The aforedescribed methods should therefore not be limited to any definition of the OSNR.

Figure 9:
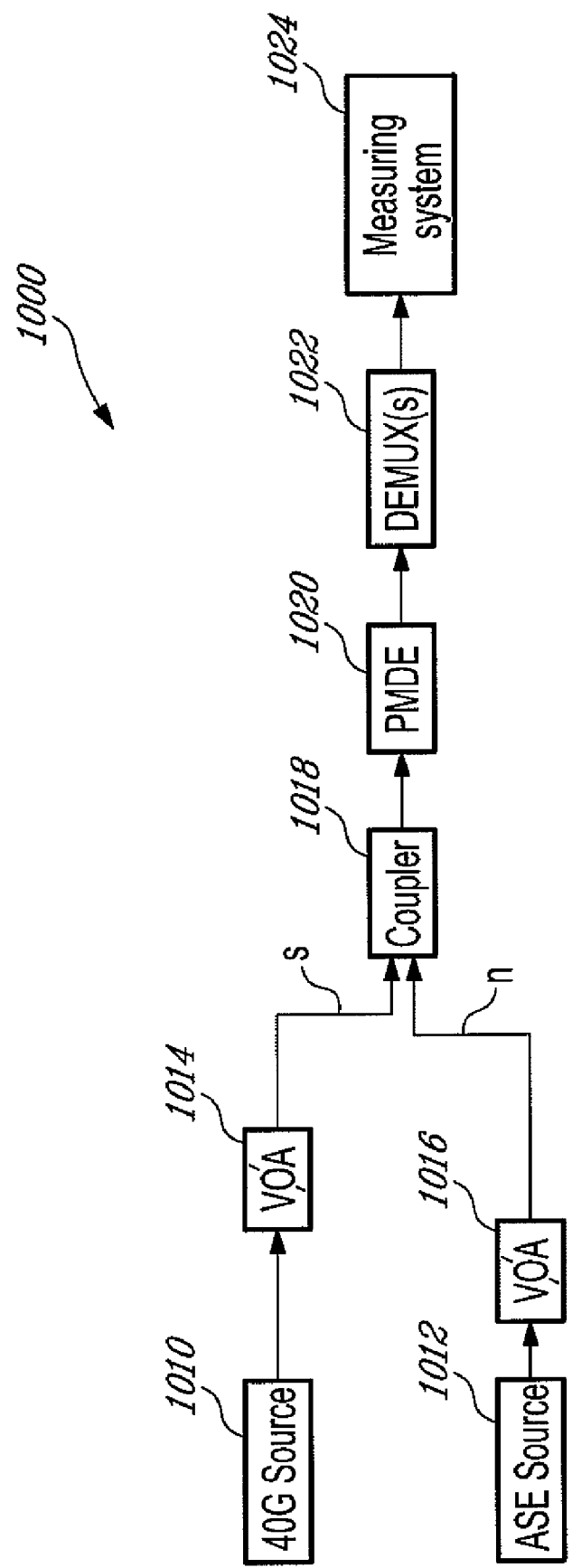
FIG. 9 is a block diagram illustrating a controlled test setup used to illustrate the performance of the method of FIG. 6.

FIG. 9 illustrates a controlled test setup 1000 used to illustrate the performance of the aforedescribed I-D-Pol method. In the setup 1000 of FIG. 9, the OSNR can be adjusted to known values since the test-bed elements are carefully pre-calibrated. The setup 1000 comprises a home-built signal source 1010 which simulates a Differential Phase-Shift Keying (DPSK) modulation of a signal at 40 Gb/s, and a ASE noise source 1012. The signal source 1010 and the noise source 1012 respectively emulate the signal contribution s and the noise contribution n. Variable optical attenuators 1014, 1016 are placed respectively after the signal source 1010 and the noise source 1012 to adjust the relative power level of the signal contribution and the noise contribution n and therefore adjust the OSNR. A coupler 1018 combines the signal contribution s and the noise contribution n into the input optical signal p. Strong-mode-coupling PMD emulators 1020 (nominally 5 and 10 ps) are alternately inserted in the signal path and the SOP input into the emulators 1020 is adjusted to maximize the PMD-induced wavelength-dependence of K. Demultiplexing filters 1022 are used to tightly filter the input optical signal p to emulate a typical DWDM input optical signal p. A measuring system 1024 such as the system 10 of FIG. 2 is then used for measuring the OSNR in accordance with the aforedescribed I-D-Pol. The system 1024 uses a FTB-5240S-P OSA as offered commercially by EXFO Inc. and a low cost two-element polarization scrambler. It is noted that the polarization scrambler provides a quite good SOP coverage but the distribution of the SOPs on Poincaré sphere is not perfectly uniform.

Figure 10:
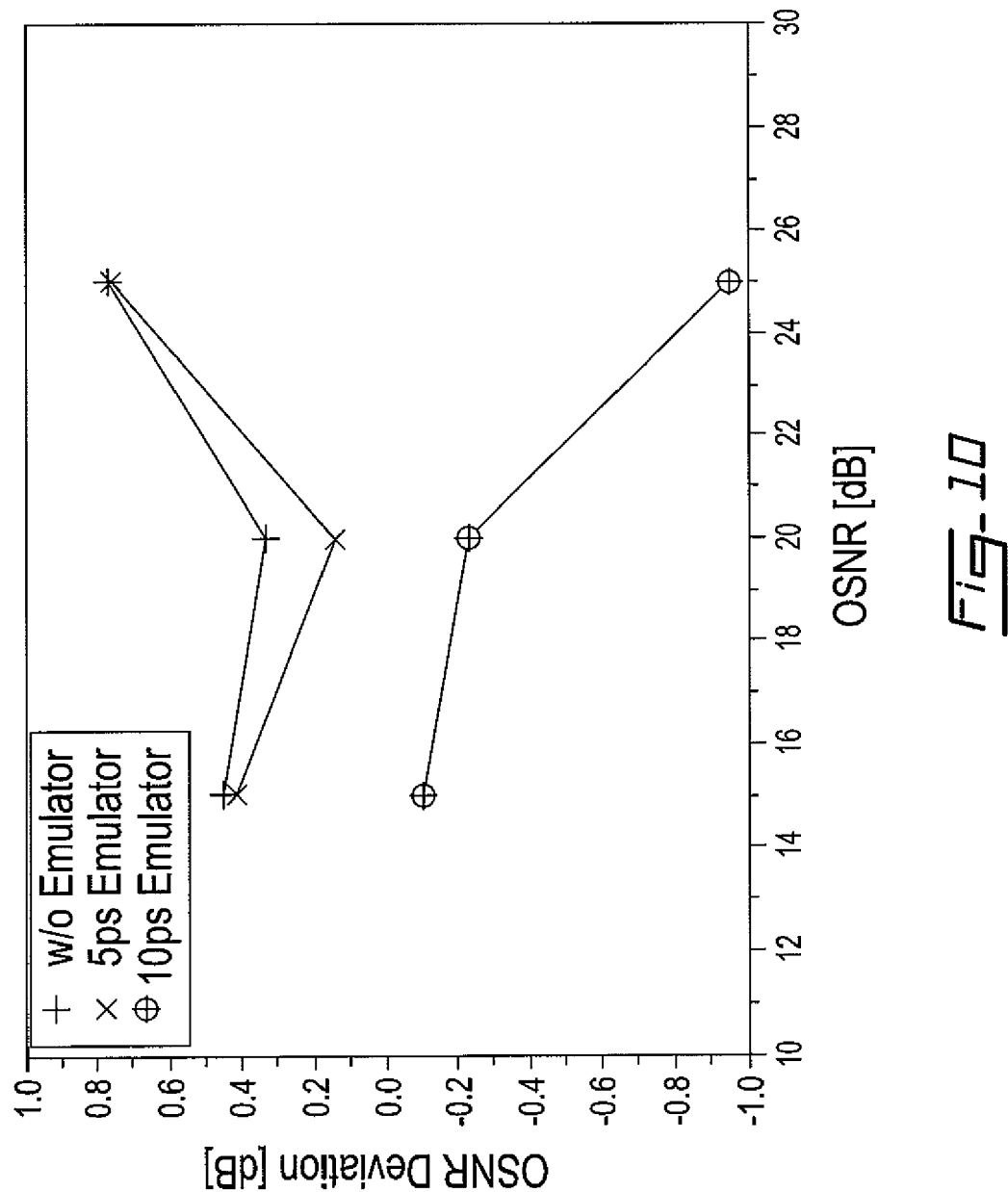
FIG. 10 is a graph showing the deviation between the OSNR as adjusted by calibration of the setup of FIG. 9 and the OSNR estimated by the I-D-Pol method of FIG. 6, as evaluated from a number $n_{SOP}$ of 500 scrambled SOPS.

For each PMD emulator 1020, the OSNR level is varied from 15 to 25 dB (with respect to a 0.1-nm reference bandwidth) and the OSNR is estimated using the aforedescribed I-D-Pol method. FIG. 10 shows the deviation between the OSNR as adjusted by calibration of the setup 1000 and the OSNR estimated by the I-D-Pol method, as evaluated from a number $n_{SOP}$ of 500 scrambled SOPs. As shown in FIG. 10, the OSNR deviation is within 0.5 dB for all emulated PMD conditions for an OSNR of up to 20 dB, and remains below 1 dB for an OSNR of 25 dB.

While illustrated in the block diagrams as groups of discrete components communicating with each other via distinct data signal connections, it will be understood by those skilled in the art that the illustrated embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the described embodiment.

The embodiments described above are intended to be exemplary only. The scope of the invention is therefore intended to be limited solely by the appended claims.

What is claimed is:

1. A method for determining an in-band noise parameter on an input optical signal ($P(\lambda)$) having a data-carrying signal contribution ($S(\lambda)$) and a noise contribution ($N(\lambda)$) within an optical signal bandwidth, said signal contribution being at least partly polarized and said noise contribution being mostly unpolarized, the method comprising:

acquiring, for a number $n_{SOP}$ of varied State-Of-Polarization (SOP) analysis conditions of the input optical signal ($P(\lambda)$), $n_{SOP}$ polarization-analyzed optical spectrum traces ($Pa(\lambda)$);

mathematically discriminating said signal contribution from said noise contribution within said optical signal bandwidth using said polarization-analyzed optical spectrum traces ($Pa(\lambda)$), said mathematically discriminating comprising:

obtaining a differential polarization response ($S'(\lambda)$) that is related to the optical spectrum of said signal contribution ($S(\lambda)$) by a constant of proportionality;

estimating the constant of proportionality of a differential polarization response ($S'(\lambda)$) to the optical spectrum of said signal contribution ($S(\lambda)$) by a constant-of-proportionality evaluation step comprising one of i) an ab initio calculation as a function of said number $n_{SOP}$ and ii) using values of said polarization-analyzed optical spectrum traces ($Pa(\lambda)$) at least close to a peak wavelength where the noise contribution is minimal relative to the signal contribution;

estimating, to within a given uncertainty, the optical spectrum of said noise contribution $N(\lambda)$ from said input optical signal ($P(\lambda)$), within said optical signal bandwidth using said constant of proportionality and said differential polarization response ($S'(\lambda)$), said given uncertainty depending upon the number $n_{SOP}$; and determining said in-band noise parameter on said input optical signal from the mathematically discriminated noise contribution.

2. The method as claimed in claim 1 wherein the constant of proportionality evaluation step is performed by using values of said polarization-analyzed optical spectrum traces ($Pa(\lambda)$) at least close to a peak wavelength where the noise contribution is minimal relative to the signal contribution.

3. The method as claimed in claim 1 wherein the distribution of said SOP analysis conditions are approximately known, and the constant of proportionality evaluation step is performed by an ab initio calculation as a function of said number $n_{SOP}$.

4. The method as claimed in claim 3, wherein said mathematically discriminating further comprises:

identifying at least one of a maxima trace and a minima trace, which corresponds to one of said polarization-analyzed optical spectrum traces ($Pa(\lambda)$), the at least one of a maxima trace and a minima trace being one of non-normalized ($Pa_{max}(\lambda)$, $Pa_{min}(\lambda)$) and normalized ($R_{max}(\lambda)$, $R_{min}(\lambda)$), calculating said differential polarization response (S'(λ)) from at least two of the maxima trace, the minima trace and the input optical signal (P(λ)).

5. The method as claimed in claim 4, wherein the at least one of a maxima trace and a minima trace are normalized by:

$(R_{max}(\lambda)=\max<Pa(\lambda)/P(\lambda)>_{SOP});(R_{min}(\lambda)=\min<Pa(\lambda)/P(\lambda)>_{SOP}.$ 6. The method as claimed in claim 3, wherein said mathematically discriminating further comprises:
constructing at least one of a composite maxima trace and a composite minima trace, by selecting for each of a plurality of wavelengths $\lambda_i$ a corresponding at least one of a maxima value and a minima value which corresponds to one of said polarization-analyzed optical spectrum traces (Pa(λ)), the at least one of a composite maxima trace and a composite minima trace being one of non-normalized ($Pa_{max}(\lambda_i)$, $Pa_{min}(\lambda_i)$) and normalized ($R_{max}(\lambda_i)$, $R_{min}(\lambda_i)$),
calculating said differential polarization response (S'(λ)) from at least two of the composite maxima trace, the composite minima trace and the input optical signal (P(λ)).

7. The method as claimed in claim 6, wherein said constructing is done iteratively each time a polarization-analyzed optical spectrum trace is acquired.

8. The method as claimed in claim 6, wherein said constructing is performed subsequent to the acquisition of said number $n_{SOP}$ of polarization-analyzed optical spectrum traces.

9. The method as claimed in claim 8, wherein said number $n_{SOP}$ is predetermined.

10. The method as claimed in claim 3, wherein said polarization-analyzed optical spectrum traces (Pa(λ)) comprise pairs ($P_>(\lambda)$, $P_<(\lambda)$) of mutually orthogonal optical spectra; and wherein said mathematically discriminating includes using said pairs ($P_>(\lambda)$, $P_<(\lambda)$), wherein each one of said pairs corresponds to mutually-orthogonal SOP analysis conditions.

11. The method as claimed in claim 10, wherein said acquiring comprises:
polarization beam splitting said input optical signal into two mutually-orthogonal samples of the input optical signal;
acquiring said mutually-orthogonal optical spectra of said pair corresponding to said mutually-orthogonal samples.

12. The method as claimed in claim 3, wherein said constant of proportionality is estimated from a probabilistic calculation which assumes a large number of polarization-analyzed optical spectrum traces (Pa(λ)) and that the distribution on the Poincaré sphere of said SOP analysis conditions is approximately known.

13. The method as claimed in claim 12, wherein said distribution is approximately uniform, said constant of proportionality is $(2\kappa_e-1)$, and $\kappa_e$ is estimated by:

$\kappa_e=0.5\times(2n_{SOP}+1)/(n_{SOP}+1),$ where $n_{SOP}$ is a number of said SOP analysis conditions.

14. A method for determining an in-band noise parameter on an input optical signal p having a data-carrying signal contribution and a noise contribution within an optical signal bandwidth, said signal contribution being at least partly polarized and said noise contribution being mostly unpolarized, the method comprising:
acquiring at least one pair of optical spectrum traces comprising mutually-orthogonal optical spectrum traces ($P_>(\lambda)$ and $P_<(\lambda)$) of the input optical signal corresponding to mutually-orthogonal State-Of-Polarization (SOP) conditions, said SOP analysis conditions being arbitrary relative to said input optical signal;
mathematically discriminating said signal contribution from said noise contribution within said optical signal bandwidth using said mutually-orthogonal optical spectrum traces ($P_>(\lambda)$, $P_<(\lambda)$); and
determining said in-band noise parameter on said input optical signal from the discriminated noise contribution, wherein said mathematically discriminating comprises:
calculating a differential polarization response (S'(λ)) from said optical spectrum traces ($P_>(\lambda)$, $P_<(\lambda)$), said differential polarization response (S'(λ)) being proportional to the optical spectrum of said signal contribution (S(λ)) within said optical signal bandwidth;
estimating a constant of proportionality of said differential polarization response (S'(λ)) to the optical spectrum of said signal contribution (S(λ)) using values of said optical spectrum traces ($P_>(\lambda)$, $P_<(\lambda)$) at least close to a peak wavelength where the noise contribution is minimal relative to the signal contribution; and
estimating said noise contribution using said constant of proportionality and said differential polarization response (S'(λ)) at least one wavelength away from said peak wavelength and within said optical signal bandwidth, said noise contribution at said at least one wavelength being representative of the in-band noise.

15. The method as claimed in claim 14, wherein said at least one wavelength comprises cross-over wavelengths where said signal contribution is estimated to be equal to said noise contribution in said input optical signal.

16. The method as claimed in claim 14, wherein calculating a differential polarization response (S'(λ)) comprises subtracting said mutually-orthogonal optical spectrum traces ($P_>(\lambda)$, $P_<(\lambda)$).

17. The method as claimed in claim 14, wherein said acquiring comprises:
polarization beam, splitting said input optical signal into two mutually-orthogonal samples of the input optical signal;
acquiring said mutually-orthogonal optical spectrum traces of said pair corresponding to said mutually-orthogonal samples.

18. The method as claimed in claim 14, wherein said noise parameter comprises an optical signal-to-noise ratio of the input optical signal.

19. The method as claimed in claim 14, wherein said noise parameter comprises an electrical noise level corresponding to the input optical signal and wherein said determining said in-band noise parameter comprises: calculating said electrical noise level from the optical spectrum of said signal contribution and the optical spectrum of said noise contribution.

20. The method as claimed in claim 14, further comprising outputting the determined noise parameter.

21. A method for determining an in-band noise parameter on an input optical signal p having a data carrying signal contribution and a noise contribution within an optical signal bandwidth, said signal contribution being at least party polarized and said noise contribution being mostly unpolarized, the method comprising:
acquiring at least one pair of optical spectrum traces comprising mutually-orthogonal optical spectrum traces ($P_>(\lambda)$ and $P_<(\lambda)$) of the input optical signal corresponding to mutually-orthogonal State-Of-Polarization (SOP) analysis conditions, said SOP analysis conditions being arbitrary relative to said input optical signal;

mathematically discriminating said signal contribution from said noise contribution within said optical signal bandwidth using said mutually-orthogonal optical spectrum traces ($P_>(\lambda)$, $P_<(\lambda)$); and determining said in-band noise parameter on said input optical signal from the discriminated noise contribution, wherein said acquiring comprises acquiring a number $n_{SOP}$ of said pair of optical spectrum traces of the input optical signal using said number $n_{SOP}$ of varied SOP analysis conditions, the characteristics of the distribution of the said varied SOP analysis conditions being approximately known; and wherein said mathematically discriminating comprises:

defining a differential polarization response ($S'(\lambda)$) that is related by a constant of proportionality to the optical spectrum of said signal contribution ($S(\lambda)$) within said optical signal bandwidth;

estimating said constant of proportionality of said differential polarization response ($S'(\lambda)$) to the optical spectrum of said signal contribution ($S(\lambda)$) as a function of said number $n_{SOP}$ of said SOP analysis conditions; and estimating, to within a given uncertainty, the optical spectrum of said noise contribution within said optical signal bandwidth using said constant of proportionality and said differential polarization response ($S'(\lambda)$), said given uncertainty depending upon the number $n_{SOP}$.

22. The method as claimed in claim 21, wherein said mathematically discriminating further comprises: calculating said differential polarization response ($S'(\lambda)$) from at least some of said pairs of optical spectrum traces ($P>(\lambda)$, $P<(\lambda)$) by:

calculating normalized traces ($R_>(\lambda)/R_<(\lambda)$) of one of said optical spectrum traces ($P_>(\lambda)/P_<(\lambda)$); and identifying an extrema trace ($R_{max}(\lambda)/R_{min}(\lambda)$) which corresponds to one said normalized traces among the acquired number $n_{SOP}$ of said pairs of optical spectrum traces.

23. The method as claimed in claim 21, wherein said mathematically discriminating further comprises: calculating said differential polarization response ($S'(\lambda)$) from at least some of said pairs of optical spectrum traces ($P_>(\lambda)$, $P_<(\lambda)$) by:

calculating normalized traces ($R_>(\lambda)/R_<(\lambda)$) of one of said optical spectrum traces ($P_>(\lambda)/P_<(\lambda)$) of each one of said pairs; and evaluating an extrema trace ($R_{max}(\lambda)/R_{min}(\lambda)$) by, for each of a plurality of wavelengths $\lambda_i$, saving an extrema value ($R_{max}(\lambda_i)/R_{min}(\lambda_i)$) among said normalized traces ($R_>(\lambda_i)/R_<(\lambda_i)$).

24. The method as claimed in claim 23, wherein said extrema trace is the trace of maximum normalized values ($R_{max}(\lambda)=\max<R_>(\lambda)>_{SOP}$).

25. The method as claimed in claim 24, wherein said calculating normalized traces comprises:

for each one of said pairs of optical spectrum traces, normalizing said one of said optical spectrum traces of said pair against a sum of said mutually-orthogonal optical spectrum traces of said one of said pairs ($R_>(\lambda)=P_>(\lambda)/P_{sum}(\lambda)$).

26. The method as claimed in claim 25, wherein said estimating the optical spectrum of said noise contribution comprises:

calculating said differential polarization response ($S'(\lambda)$) such that:

$$S'(\lambda)=(2R_{max}(\lambda)-1)\times P_{sum}(\lambda);$$

where $R_{max}(\lambda)$ is said trace of maximum normalized values and $P_{max}(\lambda)$ is said sum of said mutually-orthogonal optical spectrum traces;

estimating the optical spectrum of said signal contribution $S(\lambda)$ such that:

$$S(\lambda)=S'(\lambda)/(2\kappa_e-1),$$

where $(2\kappa_e-1)$ is the estimated constant of proportionality and $\kappa_e$ represents a proportion of the signal contribution that is measured in one of said mutually-orthogonal optical spectrum traces; and estimating the optical spectrum of said noise contribution such that:

$$N(\lambda)=P_{sum}(\lambda)-S(\lambda).$$

27. The method as claimed in claim 21, wherein said constant of proprortionality is estimated from a probabilistic calculation which assumes a large number of said acquired pairs of optical spectrum traces and that the distribution on the Poincaré sphere of said SOP analysis conditions of said acquired pairs of spectrum traces are approximately known.

28. The method as claimed in claim 27, wherein said distribution is approximately uniform, said constant of proportionality is $(2\kappa_e-1)$, and $\kappa_e$ is estimated by:

$$\kappa_e=0.5\times(2n_{SOP}+1)/(n_{SOP}+1),$$

where $n_{SOP}$ is said number $n_{SOP}$ of said SOP analysis conditions.

29. The method as claimed in claim 21, wherein said acquiring comprises:

polarization beam splitting said input optical signal into two mutually-orthogonal samples of the input optical signal;

acquiring said mutually-orthogonal optical spectrum traces of said pair corresponding to said mutually-orthogonal samples.

30. The method as claimed in claim 21, wherein said noise parameter comprises an optical signal-to-noise ratio of the input optical signal.

31. The method as claimed in claim 21, wherein said noise parameter comprises an electrical noise level corresponding to the input optical signal and wherein said determining said in-band noise parameter comprises: calculating said electrical noise level from the optical spectrum of said signal contribution and the optical spectrum of said noise contribution.

32. The method as claimed in claim 21, further comprising outputting the determined noise parameter.

33. An apparatus for determining an in-band noise parameter on an input optical signal ($P(\lambda)$) having a data-carrying signal contribution ($S(\lambda)$) and a noise contribution ($N(\lambda)$) within an optical signal bandwidth, said signal contribution being at least partly polarized and said noise contribution being mostly unpolarized, the apparatus comprising:

means for acquiring, for a number $n_{SOP}$ of varied State-Of-Polarization (SOP) analysis conditions of the input optical signal ($P(\lambda)$), $n_{SOP}$ polarization-analyzed optical spectrum traces ($Pa(\lambda)$);

means for mathematically discriminating said signal contribution from said noise contribution within said optical signal bandwidth using said polarization-analyzed optical spectrum traces ($Pa(\lambda)$), said means for mathematically discriminating comprising:

means for obtaining a differential polarization response ($S'(\lambda)$) that is related to the optical spectrum of said signal contribution ($S(\lambda)$) by a constant of proportionality;

means for estimating the constant of proportionality of a differential polarization response (S'(λ)) to the optical spectrum of said signal contribution (S(λ)), a constant-of-proportionality evaluation step comprising one of
  i) an ab initio calculation as a function of said number $n_{SOP}$, and
  ii) using values of said polarization-analyzed optical spectrum traces (Pa(λ)) at least close to a peak wavelength where the noise contribution is minimal relative to the signal contribution;

means for estimating, to within a given uncertainty, the optical spectrum of said noise contribution N(λ) from said input optical signal (P(λ)), within said optical signal bandwidth using said constant of proportionality and said differential polarization response (S'(λ)), said given uncertainty depending upon the number $n_{SOP}$; and means for determining said in-band noise parameter on said input optical signal from the mathematically discriminated noise contribution.

\* \* \* \* \*

UNITED STATES PATENT AND TRADEMARK OFFICE
CERTIFICATE OF CORRECTION

PATENT NO. : 8,364,034 B2
APPLICATION NO. : 12/859648
DATED : January 29, 2013
INVENTOR(S) : Gang He et al.

It is certified that error appears in the above-identified patent and that said Letters Patent is hereby corrected as shown below:

In the Claims

Column 23, line 8, a closing --)-- should be inserted at the end.

Column 24, line 3, the first occurrence of the word "conditions" should read --analysis conditions--;
line 39, the expression "polarization beam, splitting" should read --polarization beam splitting--;
line 57, the expression "data carrying" should read --data-carrying--;
line 59, the word "party" should read --partly--.

Column 26, line 7, the equation should read
$$-- S(\lambda) \approx S'(\lambda)/(2\kappa_e - 1), --;$$

line 15, the equation should read
$$-- N(\lambda) \approx P_{sum}(\lambda) - S(\lambda). --.$$

Signed and Sealed this
Seventh Day of May, 2013

Teresa Stanek Rea
*Acting Director of the United States Patent and Trademark Office*